(12) United States Patent
Hussein et al.

(10) Patent No.: US 7,007,235 B1
(45) Date of Patent: Feb. 28, 2006

(54) COLLABORATIVE AGENT INTERACTION CONTROL AND SYNCHRONIZATION SYSTEM

(75) Inventors: Karim Mohie El Din Hussein, New York, NY (US); Feniosky Peña-Mora, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/540,947

(22) Filed: Mar. 31, 2000

Related U.S. Application Data

(60) Provisional application No. 60/127,672, filed on Apr. 2, 1999.

(51) Int. Cl.
*G09G 5/00* (2006.01)
(52) U.S. Cl. .................. 715/751; 715/753; 715/759
(58) Field of Classification Search ............... 345/716, 345/717, 733–759, 765; 709/203–205
See application file for complete search history.

(56) References Cited

U.S. PATENT DOCUMENTS

| | | | |
|---|---|---|---|
| 4,974,173 A | 11/1990 | Stefik et al. ............... 345/751 |
| 5,068,853 A | 11/1991 | Soma et al. .................. 714/24 |
| 5,717,879 A | 2/1998 | Moran et al. .............. 345/716 |
| 5,854,893 A | 12/1998 | Ludwig et al. ............ 709/204 |
| 5,872,923 A | 2/1999 | Shwartz et al. ............ 709/205 |
| 5,940,082 A | 8/1999 | Brinegar et al. ............ 345/442 |
| 5,996,002 A | 11/1999 | Katsurabayashi et al. ... 709/204 |
| 6,343,313 B1 * | 1/2002 | Salesky et al. ............. 709/204 |
| 6,691,151 B1 * | 2/2004 | Cheyer et al. .............. 709/202 |

OTHER PUBLICATIONS

Kelly et al., A Facilitator's General Model for Manageing Socio-Emotional Issues in Group Support Systems Meeting Environments, pp. 114-123 1999.*
Housein et al., CAIRO: A System for Facilitating Communication in a Distributed Collaborative Engineering Environment, 1995.*
Octavio Garcia, et al., "Extending a Collaborative Architecture to Support Emotional Awareness," http://www.ai.mit.edu/people/jvelas/ebaa99/garcia/ebaa99.pdf, 1999.*
Charles Rich, et al., "Adding a Collaborative Agent to Graphical User Interface," pp. 21-30, UIST '96 (1996 ACM).*
Richard Bentley, et al., "An architecture for tailoring cooperating multi-user displays," CSCW 92 Proceedings, 1992 ACM.*
Bowden et al., "C3I System Analysis Using the Distributed Interactive C3I Effectiveness (DICE) Simulation," 1997 IEEE.*

* cited by examiner

*Primary Examiner*—Tadesse Hailu
(74) *Attorney, Agent, or Firm*—Daly, Crowley, Mofford & Durkee, LLP

(57) ABSTRACT

A system for supporting a coordinated distributed design process and which allows individuals to hold meetings over the internet and work together in a coordinated fashion on shared design problems is described.

20 Claims, 27 Drawing Sheets

| File Windows | File |
|---|---|

Follow the steps

2 Who is attending the meeting

3 Meeting general 1.120

Add | Gregorio Cruz
    | Humberto Cruz

People Attending

Delete | Feniosky Pena-Mora
Kerim Musssein
Kareem Benjamin

Set agenda

Edit Group | Submit

Initiate Forum

} 84

---

File

File Number: 89         Begin: 03:00
Date of Meeting: Seot 4 — 82a    End: 04:00   } 82b
Chairman calling meeting: Karim Mussein — 82c
Responsible for meeting: Feniosky Pena-Mora — 82d
82e — Type of Forum: Design Meeting
82f — Subjject: Communication Module Specs
82g — Purpose: Finalize Specs
82h — Type of meeting: Chairperson:
If unable to attend. e-mail: husselin@mitedu
     82j — E-mail: CA-design-group@mitedu
82i
     82k — CC: feniosky@mitedu

} 82

---

File

Wizards: Brainstorm | Time 00:05:03

84a — 1. System Architecture    1. Lecture       1. Karim Mussein
84b — 2. Communication Protocols 2. Free Style    2. Kareem Benjamin
84c — 3. Naming Conventions     3. Chairman      3. Gregorio Cruz Add | Add Sub | View | Remove All | Submit

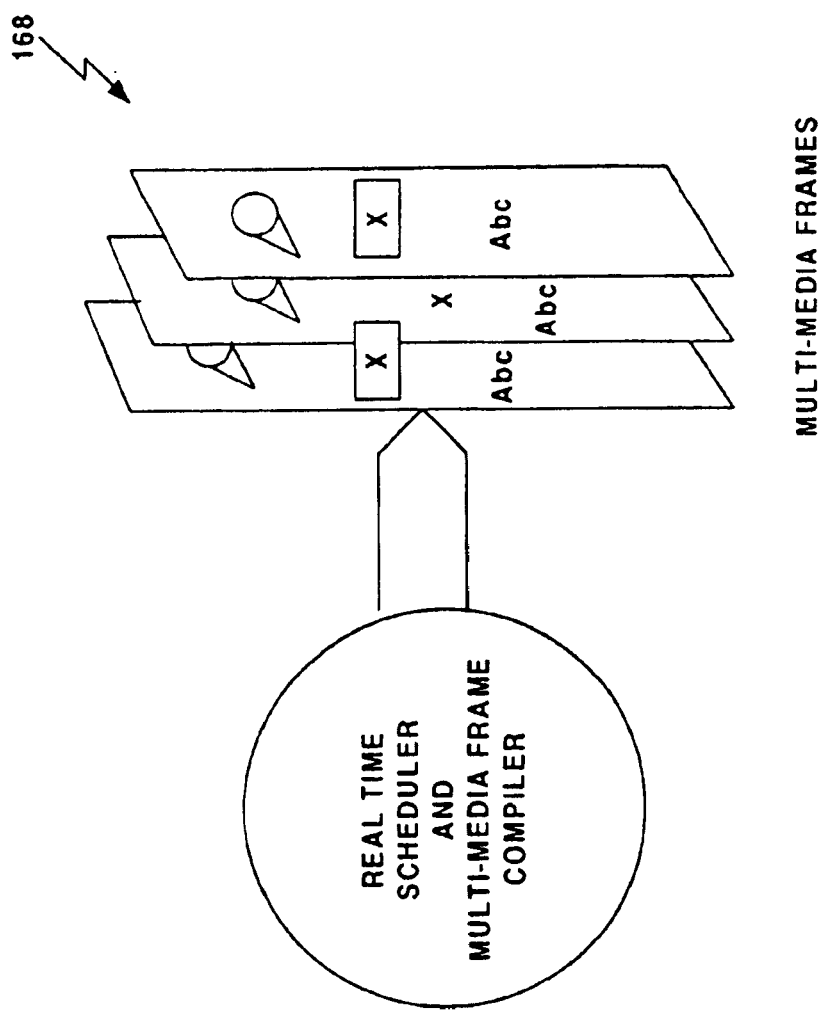
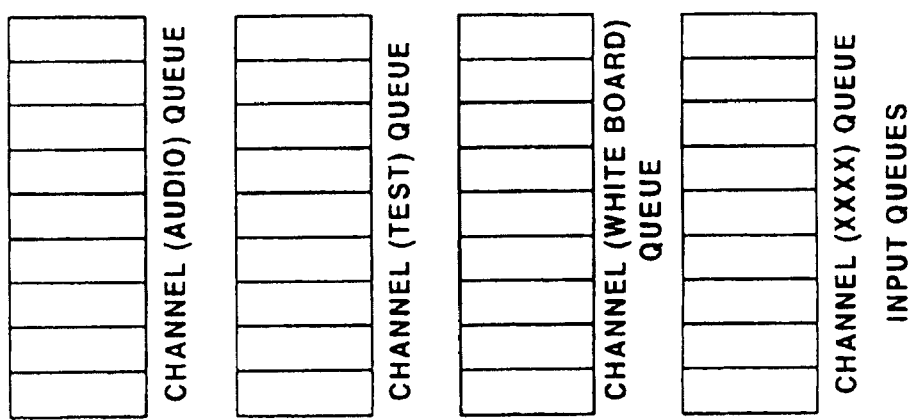
Fig. 13

COLLABORATIVE AGENT INTERACTION CONTROL AND SYNCHRONIZATION SYSTEM

RELATED APPLICATIONS

This application claims priority under 35 U.S.C. §119(e) from application No. 60/127,672 filed Apr. 2, 1999 which is hereby incorporated herein by reference in its entirety.

GOVERNMENT RIGHTS

Not applicable.

FIELD OF THE INVENTION

This invention relates to systems for supporting a coordinated distributed design process and more particularly to systems which allow individuals to hold meetings over the internet and work together in a coordinated fashion on shared design problems.

BACKGROUND OF THE INVENTION

As is known in the art, collaborative systems refer to a class of systems in which multiple users participate in a particular activity (e.g. a business meeting, a meeting to solve an engineering problem, a lecture, etc. . . . ).

As is also known, the emergence of high speed communication networks and improved visualization techniques has laid the foundation for making such computer based collaboration practical. Various collaboration tools and conferencing systems have been developed by academic institutions, office system manufacturers and communication companies.

The literature is rich with research in the area of computer mediated communication. The work spans multiple disciplines and three diverse focus areas have been identified as emerging in this research field: (1) Electronic Meeting Systems(EMS); (2) Video Conferencing; and (3) Shared social spaces. Each of these groups represents a different approach to computer mediated communication.

EMS research focuses on the meeting process and decision support tools for the meeting process. Video conferencing research is concerned with transmitting multi-media data between participants (esp. audio and video data). The shared social spaces perspective is concerned with enabling interaction and experience across distance and providing awareness and persistence within a virtual world.

Electronic meeting systems encompasses a large body of research dedicated to the support of participants in traditional meeting settings. The GroupSystems EMS and the Xerox Parc Collab project are among the first such systems developed. Both systems have tools that structure brainstorming and problem solving processes and enforce interaction controls on the participants within the shared media. However, the control of floor in discussion is governed by regular meeting norms since all participants are co-located. It has been found that some of these additional process structuring constraints on the collaboration are not necessary and may decrease satisfaction within the workgroup.

Initial research on video conferencing focused on the technical aspects of transmitting video and audio data among individuals. Much of the initial work was constrained to two-person interactions and a large portion of the work utilized a telephony paradigm for the interaction. Further developments have occurred rapidly in this field and most modern systems such as Microsoft NetMeeting, Intel Proshare, PictureTel, and SGI Inperson provide multi-person interaction and have extended audio and video services to include shared whiteboards, editors and browsers. However, these conferencing systems lack any appropriate concurrency control mechanisms and are cumbersome to use for group work.

The final area of research in telepresence is devoted to the study of virtual communities and interaction in a virtual environment. Several tools have been developed to provide awareness, persistence, and interaction in cyberspace. The two leading research efforts in this field are TeamRooms and Worlds. The primary concern of these systems is in the representation of physical concepts of space and place in the virtual world. The environments developed provide richer interaction contexts, but are currently constrained by network bandwidth and display technology.

It would, therefore, be desirable to provide a system which allows individuals to hold meetings over the internet and work together in a coordinated fashion on shared design problems. It would also be desirable to have a system which provides automated facilitation services, which supports a variety of meeting structures and which provides floor control policies to dynamically control the transition of the speaking state (the floor) from one participant to another (floor control policies).

SUMMARY OF THE INVENTION

In accordance with the present invention, a collaborative agent interaction control and synchronization system of the present invention interprets a physical meeting environment and represents the physical meeting environment as a virtual environment and also exploits the characteristics of the communication medium. This is accomplished through the deconstruction of group interaction into its core elements and the translation of these elements into computational representations. In addition, facilitation processes have been modeled in order to allow intelligent agent manipulation of the meeting process. With this particular arrangement, a system for allowing individuals to hold meetings over the internet and work together in a coordinated fashion on shared design problems is provided.

In accordance with a further aspect of the present invention, a facilitator agent for use in a conferencing system includes (a) means for monitoring communication of a participant in the conferencing system; (b) means for comparing the communication of the participant to a predetermined set of communication passages; and (c) means for providing a prompt to a participant in the conferencing system in response to the means for comparing finding a match between the communication of a participant and one of the predetermined set of communication passages. With this particular arrangement, a system which provides automated facilitation services and supports a variety of meeting structures and floor control policies is provided. Each participant in the conferencing system has an associated facilitator agent. The facilitator agent is able to recognize communication between two participants e.g. via training with action-pairs. By being able to recognize the communication, the facilitator agent is able to prompt the participant with certain suggestions. For example, if a participant in a brainstorming or free style discussion taking place around a round table types or otherwise communicates (e.g. with audio or visual cues) the phrase "let me explain," the facilitator agent may prompt the participant by asking the participant if he wishes to switch to a lecture hall setting which may be a more appropriate setting in which to give an explanation. Also, the facilitator agent may recognize during a meeting that an allotted amount of time has been spent on a particular agenda item. In this case, the facilitator agent may prompt one of the participants (e.g. the chairman of the meeting) by asking if the chairman would like to move on to the next agenda item.

In accordance with a still further aspect of the present invention, a social agent for use in a conferencing system includes (a) means for monitoring relevant components of a design environment and suggesting appropriate actions to be taken by a participant and means for learning how to effectively represent each individual of a plurality of individuals in the design environment. With this particular arrangement, a social agent which can represent an emotion or other social interaction characteristic is provided. When the social agent detects one or more communications which it recognizes as corresponding to an emotion of the user, the social agent can suggest to the user an appropriate cue in order to reflect the users emotional state. For example, the social agent may provide a visual cue by utilizing an icon of a person with a happy or sad face or by changing a color associated with that user. Thus, the social agent can suggest an image (e.g. an icon) or other cue (e.g. audio) which represents the emotional state of the user (e.g. happy, sad, satisfied, concerned, etc. . . . ).

BRIEF DESCRIPTION OF THE DRAWINGS

The foregoing features of the invention, as well as the invention itself may be more fully understood from the following detailed description of the drawings, in which:

FIG. 6 is a diagram of an agenda tool and forum manager interface;

FIG. 13 is a block diagram of a real time scheduler;

DESCRIPTION OF THE PREFERRED EMBODIMENTS

Terminology

Before describing a Collaborative Agent Interaction Control And Synchronization System and the operations performed to allow individuals to hold meetings over the internet and work together in a coordinated fashion on shared design problems, some introductory concepts and terminology are explained.

An "Agenda" is a set of guidelines for the topics of discussion in a particular meeting setting. "Asynchronous" interaction is communication that is stored in some form before transmission to the receiver of the information.

"Collaboration" refers to work performed jointly with others especially in an intellectual endeavor. "Conferencing" is the act of structured and formal group interaction and sometimes refers exclusively to distributed group interchange.

"Facilitation" is the act of providing process interventions in group discussion to enhance the efficiency and effectiveness of the interaction.

"Floor" refers to the right of one member of a group to communicate to other members within a group discussion or meeting.

"Interaction" is communication that engenders reciprocal communication or action.

"Knowledge" refers to the conceptual model of the environment and other information that a person is exposed to and assimilates.

"Learning" is the process by which knowledge is built, transferred and shared.

"Meeting" refers to individuals coming together for a common purpose.

"Negotiation" refers to the process of resolving conflicts or disputes among individuals.

A "participant" refers to a user of the conferencing or collaboration system that registers with a Name Server. A participant may have a specific role in a collaboration instance. The simplest example is that of a chairman. The chairman is in charge of a meeting and presides over the proceedings. On a deeper level, there may be participants that are in charge of certain functional units. He/she may have specific applications or databases that are dedicated towards his/her role and can bring any of these to a session.

"Synchronous" refers to events happening, existing, or arising at the same time while "synchronous interaction" refers to communications that are immediate and whose expected response is immediate. These include face to face meetings, telephone calls and video conference interactions.

"Telepresence" is the ability to provide a semblance of co-location of distributed individuals through the use of computer and communication technologies.

Figure 1:
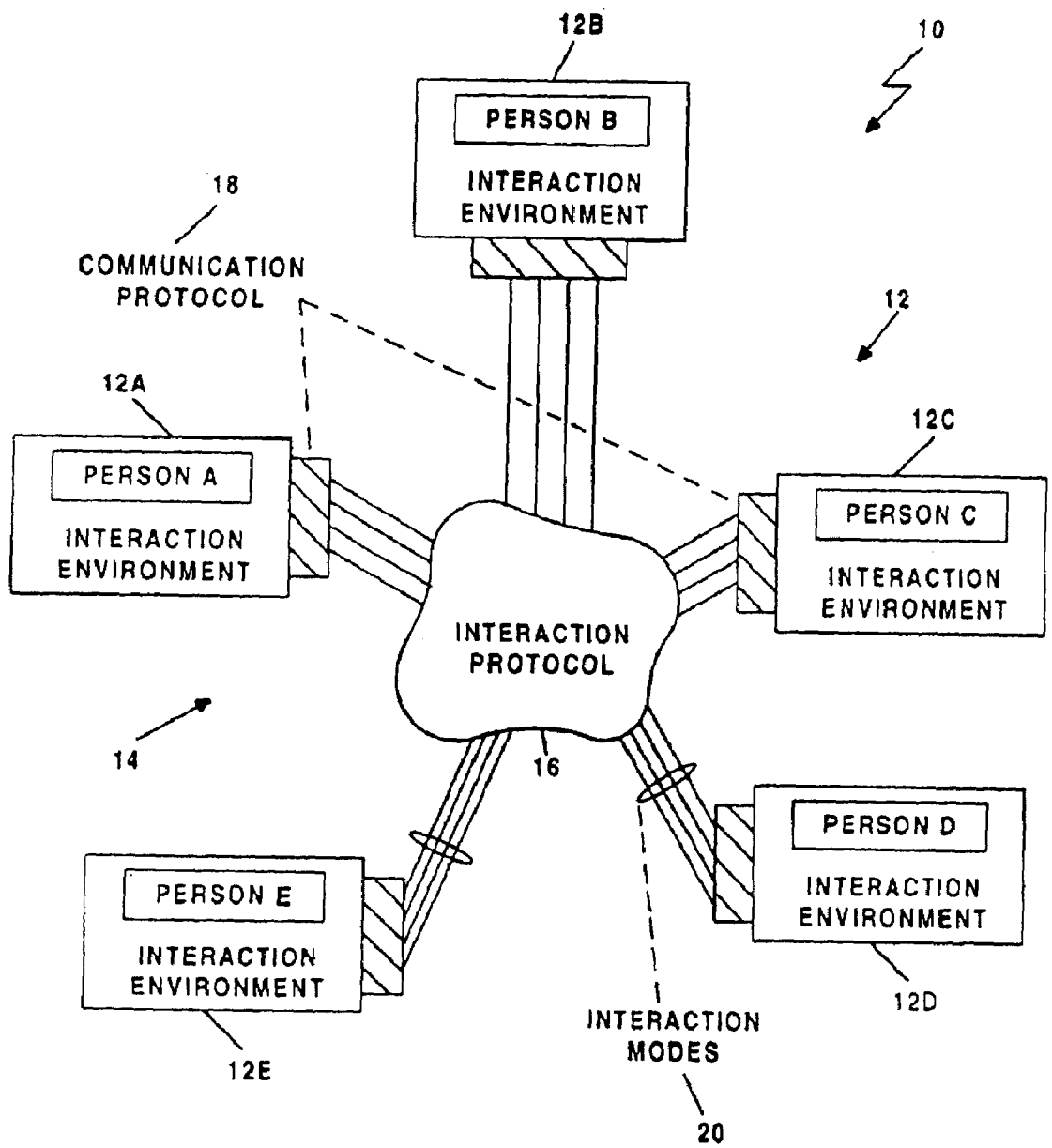
FIG. 1 is a block diagram of an interaction system.

Referring now to FIG. 1, an interaction system 10 includes a plurality of interaction environments 12a–12N, generally denoted 12. Each of the interaction environments include a processing device or machine coupled via a network 14 over which an interaction protocol 16, a communication protocol 18 and interaction modes 20 are implemented and enforced between the environments 12. The interaction environments 12 define an interface between human and machine models of the interaction. The interactions are typically exemplified by metaphors that represent protocol distinctions. For example a room metaphor is commonly used to denote presence of individuals in proximity. The interaction environments 12 thus define a space for the individual's interface to the machine and other networked individuals.

The communication protocols 18 correspond to a set of rules for information transmission across a network and enable the transmission of information from one machine to another through the network 14.

Interaction protocols 16 enforce order on the communication over the network collaboration by controlling the ability to address particular individuals. An interaction protocol is a set of rules and algorithms that govern the accessibility of other participants in an interaction. These include definitions of proximity (proximity in a distributed sense has different implications than in the physical environment), addressability (controls over the ability to interact with others in the interaction environment) and presence (definitions of visibility of individuals to others).

The interaction modes 20 define the input and output devices by which information is displayed within each individual's interaction environment. Interaction Modality defines the variety of information structures and media available to the interaction. These may include audio transmission, video transmission, image transmission, text transmission and structured data (in the form of databases, schedules, CAD drawings, formatted text, etc. . . .)

Figure 2:
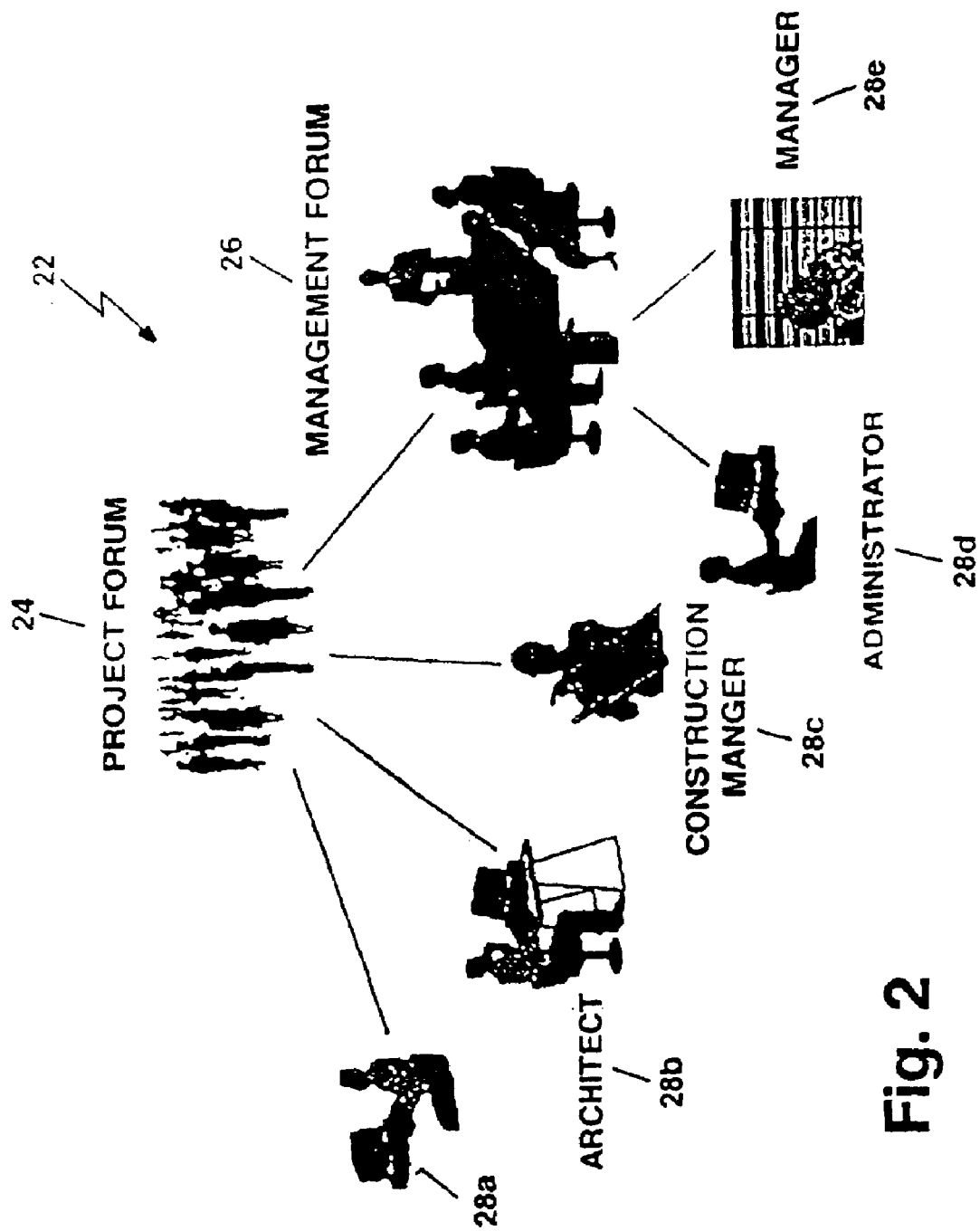
FIG. 2 is a diagrammatical representation of a hierarchy of forums.

Referring now to FIG. 2, a forum 22 which maintains a conference among individuals is comprised of other forums 24, 26 as well as a plurality of individuals 28a–28e. Each forum is associated with a forum moderator that defines the control behavior of the conference. The associated forum server (e.g. one of forum servers 34a, 34b in FIG. 3) processes requests for membership to the forum as well as requests to speak by participants within the forum. As shown in FIG. 2, the Management Forum 26 is a member of another forum called Project Forum 24. Thus, the forums 24, 26 and 28a–28e are arranged in a hierarchical forum structure.

The project and management forums 24, 26 have a parent-child relationship and any restrictions on membership and communication must be upheld by the child forum (i.e. management forum 26). Thus, the Management Forum 26 must be at least as restrictive as the Project Forum 24.

Figure 3:
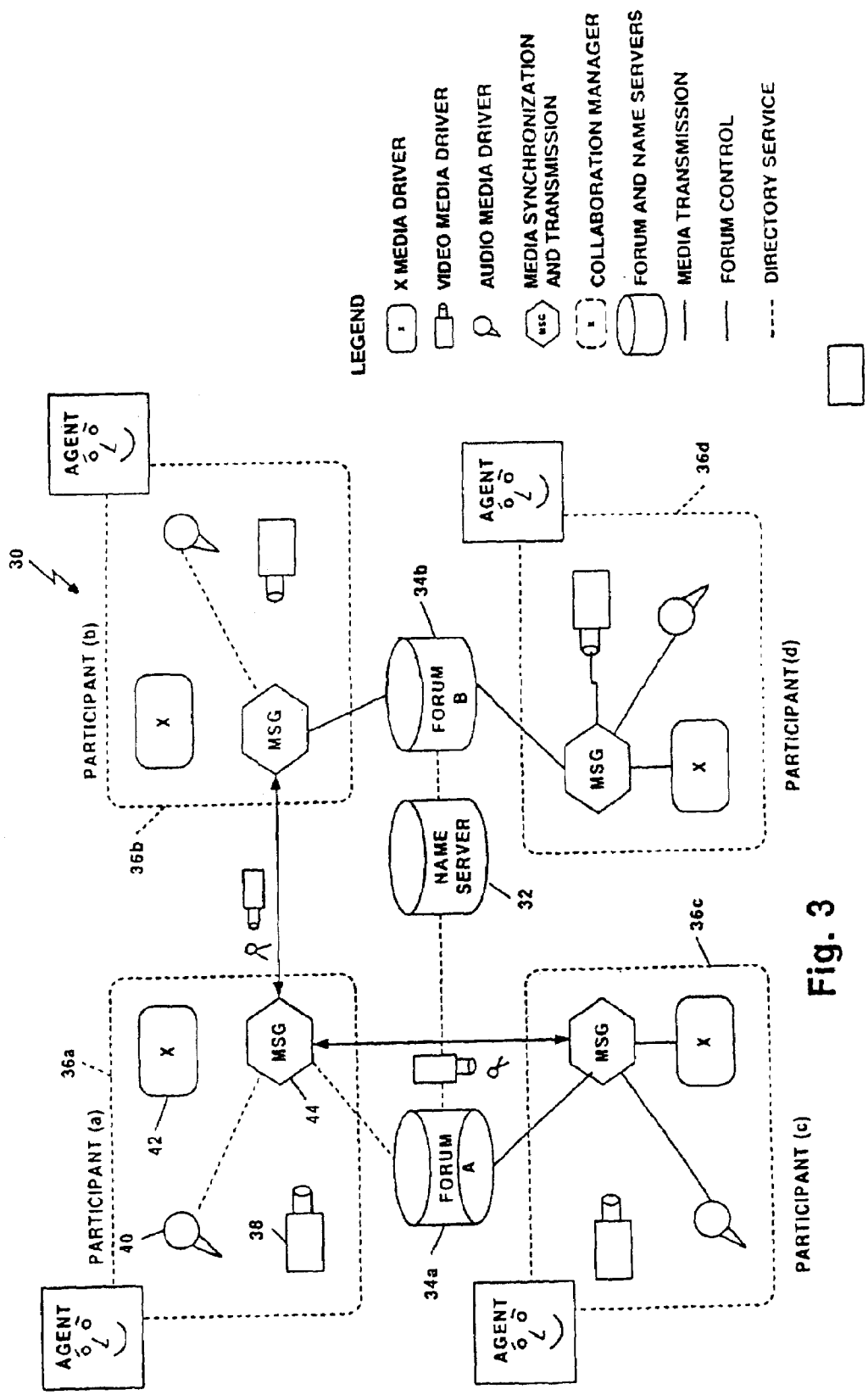
FIG. 3 is a block diagram of a collaborative agent interaction control and synchronization system.

Referring now to FIG. 3, a collaborative agent interaction control and synchronization system or more simply a collaboration or conferencing system 30 includes a name server 32 having a pair of forum servers 34a, 34b coupled thereto.

Each participant (a)–(d) engaged in a conference spawns a collaboration manager (shown as a dashed boxes 36a–36d) which is comprised of media drivers 38, 40, 42, (shown in FIG. 3 as pictograms of the media i.e. video camera, microphone and X display) and message servers 44 (indicated by the acronym 'MSG'). The operation of the media drivers 38, 40, 42 is described in further detail below. The message servers 44 package data for transmission over the network and enforce synchronization constraints during media play-back.

The forum servers 34A, 34B are processes that maintain control of a conference among several individuals and enforces membership constraints. Furthermore the forum servers 34a, 34b log all conference proceedings. Forum servers 34a, 34b are spawned by forum managers (not shown) that define a specific control methodology. Forum managers 36a–36d also provide mechanisms for converting a forum server's control strategy. Finally, the name server 32 maintains a directory of all participants, forum managers and forum servers within the conferencing/collaboration system 30. The name server 32 allows each participant (a)–(d) to easily address any other member or forum in the collaboration system 30.

The name server 32 is an independent server that acts as a global directory for the conferencing system 30. The following information is listed in the name server for each participant and each forum and may be queried by any participant or forum server: (1) Participant Name and Location: including media driver locations and media descriptors; (2) Participant Status: each participant is either in an active or non-active state. Active denotes that the user is logged into the conference system via a Collaboration Manager on his/her workstation. Non-active status is given to users who are subscribers to the CAIRO system but are not reachable; (3) Forum Manager Name and Location: including a brief description of control style; (4) Forum Name and Location: including a listing of shared media drivers. (5) Forum Status: each forum is either in an active or non-active state. Active forums imply a conversation is occurring among the participants of the forum. Non-active forums are structured meeting skeletons with membership lists for a meeting that is not currently in session.

During a meeting or conversation, a particular participant can be in one of three states: active (i.e. speaking or demonstrating), pending (i.e. awaiting his/her turn to speak), or inactive (i.e. passive observer or listener). Each participant's state is relative to a specific forum and is stored in the forum server.

A speaker may initiate a request (a speaker request): This is equivalent to a professional raising his/her hand in a meeting situation. The speaker request indicates to the forum moderator and to the other members of the forum the participant's intent to speak. A speaker request is accompanied by a qualification of the speech act the speaker intends to perform. The forum server would then place the participant on a list of pending speakers depending on his/her qualifications. In a democratic forum a participant becomes active if a majority agrees to his/her request to speak. Furthermore, the interaction facilitator agent process executed on the server can automatically moderate (i.e. choose the active speakers from the pending queue) a forum based on pre-compiled speaker qualification data. The system includes a mode of conversation referred to as "interjection" in which the participant can interrupt an ongoing conversation for a limited amount of time.

Group meetings can take on multiple characters and structures and thus group formation and meeting cycles require various group control procedures and paradigms. A list of primitive controls on each forum from which a more complex collaboration control mechanism may be devised includes: (1) chairperson, (2) intefjection duration, (3) maximum speech duration, (4) maximum number of active speakers, (5) side conversations, (6) external conversations, (7) logging mode, (8) speaker evaluation, (9) speaker ordering, (10) sample collaboration schemes and (11) completely uncontrolled. The forum creator may choose to over-ride any of these primitives for a particular forum member.

In the chairperson mode, one or more participants—each referred to as a chairperson, are designated as holding a privileged status within the forum. The chairperson may preempt speakers and arbitrarily choose active speakers.

The interjection duration control specified for a forum is the length of time allowed for interjections. An interjection time of zero indicates no interjections are allowed. Conversely an infinite interjection time allows for complete unstructured free-form conversation.

A maximum speech duration control specified for a forum is the length of time allocated to a single member to hold the floor of the conference while the maximum number of active speakers control parameter indicates the number of concurrent speakers allowable during the conference.

The side conversations control enables/disables side conversations. Side conversations are two-way or multi-way conversations among a subset of the forum members. Thus, forums may be created that do not allow such side conversations to exist.

Similarly, external conversation control parameters enable/disable the ability to have external conversations. External conversations are conversations between a member of a forum and other non-members while a forum is active. This form of conversation may also be restricted by the forum.

The logging mode allows either continuous logging or no logging at all of the ongoing conference. The speaker evaluation control provides a voting mechanism implemented to evaluate participant acceptance of a specific topic or to determine participant value to a conference. The results of this evaluation may be used to determine the order of speaker priority for a conference. The speaker ordering control allows the ordering of the pending speaker queue. This may be on a first come first serve basis or it may be based on some other evaluation criteria including but not limited to ordering of speakers based on value determined by the participants (as described in conjunction with the speaker evaluation control) or ordering based on chairperson choice in a chairperson controlled conference. This control mechanism satisfies the requirement for free form and structured conferencing The collaboration primitives discussed above are combined to form a collaboration scheme or mechanism. The conferencing system of the present invention can easily be extended to provide many different collaboration schemes. The list of schemes which can be implemented includes but is not limited to: (1) a free scheme in which all participants may talk at any time; (2) a completely uncontrolled scheme in which all speakers may speak at once; (3) a democratic scheme in which the choice of the active speaker is based on a vote by all other participants; (4) a chalk-passing scheme in which the last active speaker chooses the next person to be a designated active speaker and each speaker may only speak for the time allotted by the Maximum Speech Duration parameter specified above; (5) a chairperson control scheme in which a specific privileged participant (Mr. X) has the ability to choose the participant who should address the conference at any specific time; (6) a Modified Delphi scheme in which the system polls all participants in the collaboration on their views regarding a specific design problem and the results are compiled and presented to the conferring experts and the participants are then re-polled. This process is repeated by the questioner until the experts provide a consistent analysis. The Delphi method is used extensively in polling experts on directions in hi-tech industry. In this control strategy there exists a moderator as well as a questioner.

The completely uncontrolled scheme, for example, can be specified with the following parameters: chairperson='none', side conversation=all, external conversation=all, speaker ordering=first-come-first-serve. The democratic scheme can be specified with the following parameters: chairperson='none', side conversation=all/none, external conversation=all/none, speaker ordering='highest vote'. The chalk-passing scheme can be specified with the following parameters: chairperson='last speaker', side conversation=all/none, external conversation=all/none, speaker ordering='chosen by chairperson'.

The chairperson control scheme can be specified with the following parameters: chairperson='Mrs. Q', side conversation ALL/NONE, external conversation=ALL/NONE, speaker ordering='chosen by chairperson'.

Furthermore, a scheme which is relatively quick and more dynamic compared with prior art techniques can be implemented using the collaboration techniques of the present invention. This scheme can be specified with the following parameters: chairperson='moderator/questioner' side conversation=all/none, external conversation=all/none, speaker ordering='round robin'.

Figure 4:
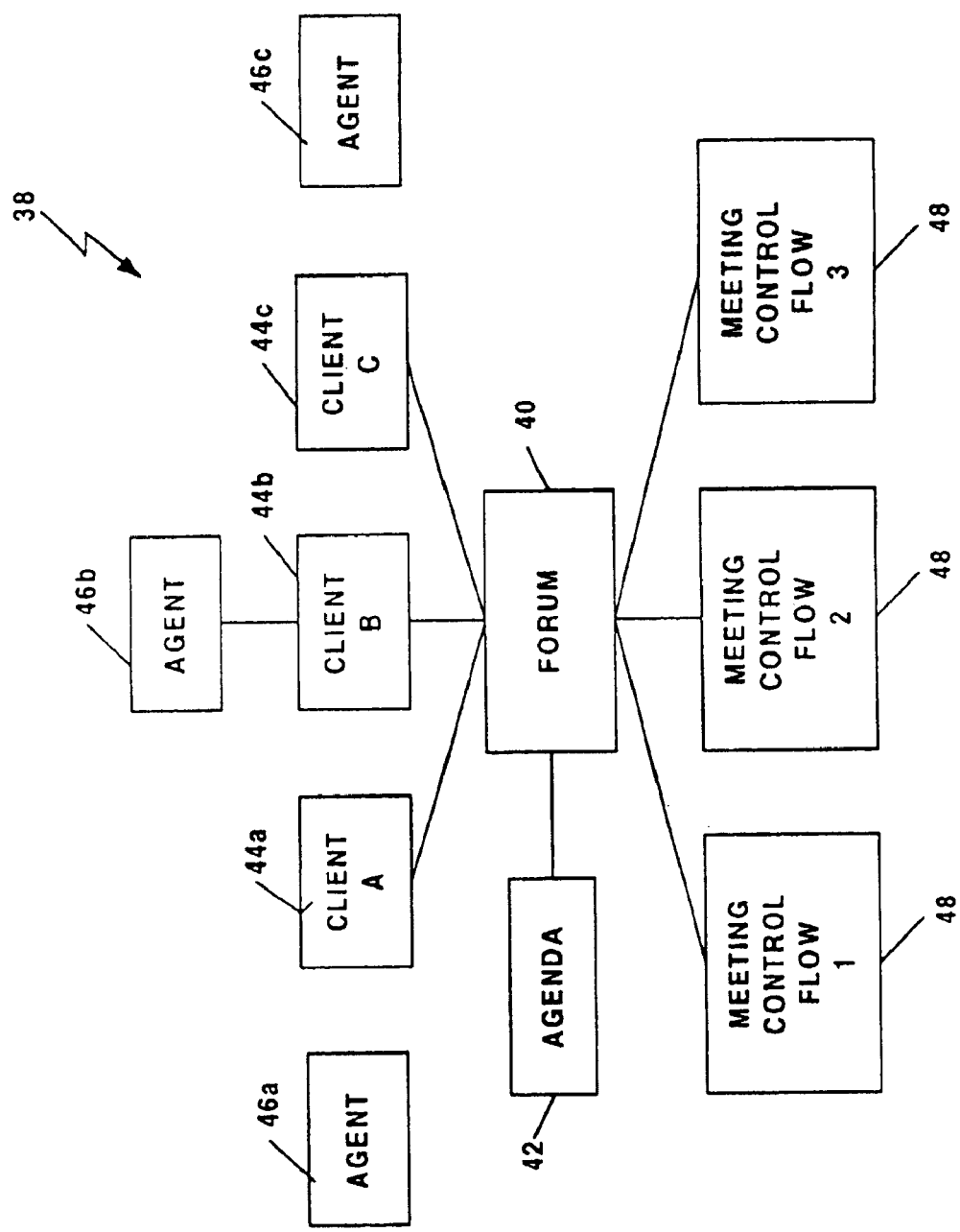
FIG. 4 is a diagram of agent architecture.

Referring now to FIG. 4, an agent architecture includes a forum 40 having an associated agenda 42. Also associated with the forum 40 are a plurality of clients 44a–44c. Although three clients are here shown, it should be appreciated by those of ordinary skill in the art that any number of clients (limited only by the current technological state of the art), may be used. Each of the clients 44a–44c, has an associated agent 46a–46c. Each of the agents 46a–46c provides information to its respective participant-client 44a–44c depending upon information concerning the participants 44a–44c received by the agent The class for the implementation of the agent suggestions is shown in Appendix A.

FIG. 4 illustrates the agents that are involved at the forum level and at the client interface. The facilitator agent keeps track of a meeting agenda and also the meeting process. The agent at the client interface keeps the user informed about the meeting participants and bridges the user interaction with the rest of the meeting members with social queues.

When a user wishes to use the system, he or she must start up the client 44 and register with the nameserver 32 (FIG. 3). In one embodiment, the clients 44a–44c and nameserver 32 are Java message sending programs executing on some machine coupled to the internet. Once a client 44a–44c has registered with the nameserver 32, the nameserver 32 provides the client 44a–44c with a list of all the meetings that are currently running on the conferencing system 30 (FIG. 3). A forum 40, also referred to as a meeting, is another Java message sending program. Once a client (e.g. one of clients 44a–44c) decides to enter a forum (e.g. forum 40), messages are then passed directly from the client to the particular forum.

A forum is a virtual presentation of a meeting room (e.g. meeting rooms 90–94 in FIGS. 7, 7A and 7B) where clients can collocate over the internet. The basic concept is much like a chat room, where users can join a chat and talk to each other. One difference, however, is that the conferencing system of the present invention provides communication tools to the clients 44a–44c that are more conducive to the engineering and other collaboration processes. Another distinction between a chat room and the conferencing system of the present invention is that the conferencing system of the present invention embodies the notion of a meeting control strategy, including chaired meetings, roundtable meetings, and lecture meetings.

Furthermore, chat rooms allow anyone to comment or talk at any point in time. However, actual engineering negotiation meetings cannot follow this format for it would lead to chaos. Thus, in contrast to a chat room, the conferencing system of the present invention allows forums to take on characteristics similar to those of actual meetings. The characteristics are implemented using so-called meeting control strategies. A meeting control strategy is a way of deciding which member of a meeting is allowed to contribute to the meeting. An example of a meeting control strategy is one that models a chaired meeting. In the chaired meeting strategy, one client is designated as the chairperson of the meeting. If another client wishes to collaborate with other clients in the meeting, he or she must first request permission from the chairperson. Another example is a roundtable control strategy. As may be inferred, any client can collaborate at any point in time for there is no chairperson, and permission need not be requested.

To help implement the meeting control strategies, the collaborative system utilizes behavior based learning agents. A behavior based learning agent includes means for analyzing group and individual performances, means for determining user preferences, a conferencing means, a learning means coupled to the conferencing means for receiving information over a period of time and for updating responses to the learning means over a different period of time through interaction with a user and the conferencing means. The learning agent also includes means for interacting with another user representative agent and for agreeing on an appropriate process intervention to enhance a meeting process.

The learning means learns by being presented with one or more situation-action pairs which are classified or structured in a rule-base such that the learning means can proactively respond to future situations without user intervention.

Behavior based learning agents are used to perform the analysis of group and individual performance as well as to determine user preferences. The agent collects information on a variety of user parameters including but are not limited to: amount of time on the pending speaker queue, number of people on the pending queue, qualifications of the speaker/audience and their relevance to the agenda topic, activity on each member computer/system, level of engagement of members of the conference, a brief history of level of interaction of each individual (including but not limited to time spent as speaker, time spent on the pending queue, number of interactions with other users etc. . . . )

These agents learn over time through interaction with the user and the conferencing application. The agent learns to represent the user and express his/her frustrations. All user representative agents can then agree on an appropriate process intervention to enhance the meeting process. A user representative agent maintains information about the behavior of a single member in the conference. It maintains the history of the interaction in the conference, a description of the interests/expertise of the user, a history of past participation in conferences (time spent, time spent speaking, time spent pending etc. . . . ). They encode all data on a single user across a set of meetings. The interaction facilitator agent on the other hand retains Information on a single meeting without historical data on each of the participants.

Agents learn by being presented with situation-action pairs which are classified or structured in a rule-base. Situation-action pairs are rules, each of which has a situation and a corresponding action. Each agent has a set of situation-action pairs that it uses as a guide for the facilitation process. When encountered by a particular situation the agent looks up its set of rules and acts accordingly. An example of this would be the dictionary that the agent uses to monitor user cues from the textual chat that the user inputs. In this case the agent parses smilies (textual representations of expressions such as smiling:-) or frowning:-(or other expressions) that the user types to represent an emotion graphically. Future situations can then be proactively responded to without user intervention.

Two design decisions in agent implementation are feature selection and learning algorithm choice. There are several features that constitute the whole learning process of user preferences. These features can be listed as follows: (1) User modeling and (2) Learning about the user.

User modeling refers to the capability of methodology and the system to capture information pertaining to the context of collaboration. The main components of this are Knowledge representation which defines the internal structure and functionality of the user model and Persistent profiling which defines how to reuse a user model over time and across applications.

Learning about the user refers to the process t performed in order to better fine tune and to automate the development of the user model. In order to achieve this a method of machine capturing and generalization of data is done using the Data observed and learned, a Generalization Scheme and a Memory model.

In one approach, to increase the effectiveness of agent personification and in building user acceptance, it may be desirable to utilize "dumb" agents that learn through interaction with the user in order to build a relationship between the agent and the user.

As mentioned above, "dumb" agents build trust incrementally with the user. On the other hand, "dumb" agents may also be very frustrating and ineffective in simplifying the user's tasks. They may require additional boot-strapping time before becoming effective in simplifying user tasks.

It should be appreciated that the prior art techniques can be used to train the dumb agent. The core idea is to build a learning engine that uses a particular learning technique referred to as clustering algorithms. These techniques have been implemented in order to train an agent over a short term as well as a long term. This is where the issue of short term and long term memory is dealt.

Figure 5:
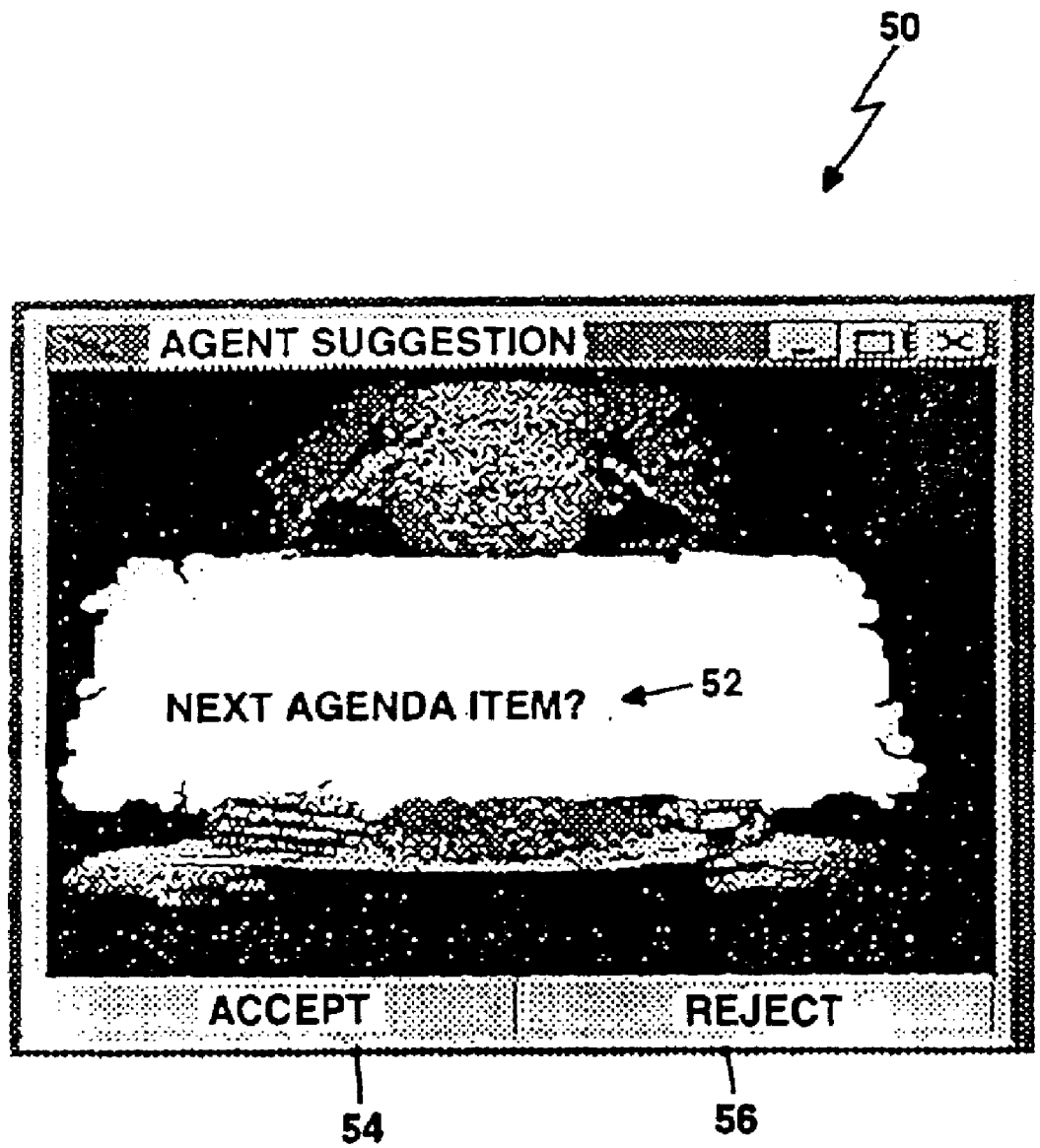
FIG. 5 is a diagram of a facilitator agent.

Referring now to FIG. 5 a facilitator agent 50 is shown. The facilitator agent 50 is a program that monitors the actions of the users, residing with the moderator of the meeting. The agent 50 procures information from the interactions among users and tries to make intelligent suggestions to the moderator that may increase efficiency in the meeting proceedings. The agent possesses functionality, focusing on the agenda, certain textual cues, and request activity.

For example, during a meeting, if the time allotted for an agenda item has expired, the agent will appear and provide a prompt 52. In this example, the agent 50 prompts the moderator to determine if the moderator wishes to continue to the next agenda item. In this case the prompt 52 is a text prompt asking "Next agenda item?" It should be appreciated, however, that in some embodiments different prompts may be used including but not limited to audio prompts and color prompts.

In this case, the agent 50 is a passive timer for the user. The client can choose to accept the suggestion or reject it depending on how he/she feels the meeting is proceeding by "clicking" on the accept or reject buttons 54, 56 respectively. However, the agent 50 still serves as a reminder that keeps the participants on topic and in-line with their meeting agenda.

Referring now to FIG. 5A, the agent 50 also reacts to certain textual phrases that are sent and received through the text driver. The agent 50 includes functions to parse the text that is being delivered for specific key words. For example, if the agent 50 recognizes a word such as "explain" 58, the agent 50 may suggest to the moderator that he/she change the meeting style from the free style view 60 to a lecture control strategy (e.g. by changing the view to a lecture hall 92 shown in FIG. 7A).

Similarly, if the word "discuss" were recognized by the agent 50, then the agent 50 would suggest that the freestyle meeting strategy 60 be employed. Again, the user can then decide whether to accept the suggestion or not.

Finally, the agent 50 also responds to actions that are being taken by the users. If the agent 50 notices that a lot of requests to speak are being made by the participants, then the agent 50 may recommend that a freestyle meeting strategy be applied (i.e. that a free style view such as view 60 be used). This way, the meeting may run more smoothly if users do not have to constantly request permission to speak.

The meeting control process should help dissipate conflict elements among the participants during an engineering design negotiation. Negotiators often employ professional facilitators to invoke meeting process changes to ensure the focus of the negotiating group and to reduce conflict. Characteristics of effective facilitators include but are not limited to: (1) neutrality; (2) process expert; (3) maintains issue focus; (4) information resource; (5) trustworthy, non-authoritative; and (6) not a decision maker.

In the system of the present invention, some of these requirements are satisfied through the use of agents such as the facilitator agent 50. These agents reduce the overhead required in the facilitation of change negotiation. The facilitator agents are: (1) inherently neutral since they are computer-based and have no emotions or agendas; (2) encoded with various process intervention heuristics and their reaction evolves with the use of the system; and (3) trustworthy since they acquire the trust of the user by informing the user of all the agent's decisions and allowing the user to adjust agent control parameters as they evolve.

The facilitator agents are coupled with several control mechanisms described herein. The control mechanisms are different meeting styles and the protocols that go with each kind of meeting style. The different meeting protocols that have been implemented are Chairman style, Lecture style, Class room style, brainstorming and the Court system.

The agents establish the appropriate control mechanism for a given meeting setting. The choice of conference control strategy (e.g. freestyle, lecture or board meeting) at appropriate meeting milestones is critical in the effective coordination of group effort. The agent architecture developed in the conferencing system of the present invention automatically determines the strategy relevant to the current topic of discussion.

The basis of the agents decision is an encoded meeting agenda as well as the meeting indices. Although the agenda and process representations are linear, typical design discussions involve a cyclical refining process. Hence, the agent must be able to traverse the agenda and process in accordance with the discussion patterns. The mapping of process and agenda stage to appropriate facilitation strategy are currently very simple and are based on several heuristics. The critical issue is the agent's responsibility to determine the transition between the stages outlined in the agenda and process model. The agent bases its behavior on the conversation graph and its relation to the design process and expressed agenda.

Referring briefly to FIG. 6 a screen image 80 provided by an agenda tool includes an forum manager portion 82 and agenda portion 84. The forum manager portion 82 includes has fields which specify the meeting date 82a, meeting length 82b, person calling the meeting 82c, person responsible for the minutes 82d, the type of forum 82e, the subject 82f, the purpose 82g, the type of meeting 82h, and RSVP regrets e-mail address 82i, an email address 82j and a copy line 82k.

The agenda portion 84 includes a first agenda item 84a, "system architecture," a second agenda item 84b "Communication Protocols" and a third agenda item 84c "Naming Conventions." By selecting an agenda item and selecting the "View" button, users can see who is in charge of a particular agenda item, how long the agenda item should last, and what type of meeting control strategy is being employed for that particular agenda item. In the example provided in FIG. 6, the agenda item 84c "Naming Conventions" uses the chairman meeting control strategy. In this strategy, the chairman of the meeting, in this case Gregorio Cruz, can communicate with other meeting members as he so desires. However, if other members wish to communicate, they must first receive permission from the chairman. The conferencing system of the present invention thus provides pop-up menus as a means for talk requests.

Users wishing to communicate with everyone in the meeting can click on the table. A menu will appear with several options including a Talk-Everyone choice. However, users wanting to communicate with a particular member can click on the image of the person. Another menu will appear with more options including a Talk option. As mentioned above, depending on the current meeting control strategy, The facilitator agent makes use of the information included in the agenda 84 and performs certain functions (e.g. provides prompts, hints, suggestions or the like) in response to the information. For example, since the third agenda item 82c specifies "chairperson," the facilitator agent may prompt/remind the chairman to use a boardroom visual environment (see environment 90 in FIG. 7).

Figure 7:
FIG. 7 is a view of a chairperson mode.
Figure 7A:
FIG. 7a is a view of a lecture mode.
Figure 7B:
FIG. 7b is a view of a brainstorming mode.

Similarly the facilitator agent may recognize through the preplanned agenda 84a–84c or through recognition of comments made by a participant in the meeting that portions of the meeting may be better suited to a lecture hall environment 92 or a brainstorming mode 94 in which case the facilitator agent would prompt/remind the appropriate participant to use the appropriate ones of the visual environments (e.g. environments 90, 92, 94 in FIGS. 7–7B).

Referring again to FIG. 5A, the facilitator agent 50 builds a rapport with the conferring individual through an interface technique that builds trust between user and agent. Initially the agent is encoded with very basic heuristics and will not make any independent decisions. The agent has a caricature representation 62 that informs the user of its current process state (thinking, suggesting, gratified, disappointed, or confused).

As decision points arise, the agent makes suggestions and through the caricature representation 62 shows expressions of sadness or happiness dependent upon the reaction of the human user. As the agent 50 suggests process interventions, the user may either reject or accept them. Eventually the agent builds thresholds for decisions that may be taken without user intervention. This interactive agent scheme ensures that a trusting relationship is built between agent and user.

FIGS. 7–7B show user interfaces and controls for the collaborative system of the present invention. Environment 90 (FIG. 7) is a boardroom/chairperson environment, environment 92 (FIG. 7A) is a lecture environment and, environment 94 (FIG. 7B) is a freestyle environment.

Each agent has access to information regarding the user as well as the negotiation process. This includes a thresholded encoding of user preferences for agent autonomy (i.e. an indication of what decisions the user is willing to delegate to the agent). The information is supplied to the agent through a set of screens that set user preferences. The current understanding of the agent is displayed to the user who can then set the tolerances for the agents automated activity. The agent decisions on process interventions are based on the following aspects of the agent environment: (a) the current topic's recommendation list; (b) threshold levels indicating user preferences; (c) an averaged record of the participation of each participant in the negotiation process; and (d) the complete conversation model of the ongoing negotiation.

It is important to note that the agent has no direct understanding of the topic being discussed except for that provided by a meeting agenda. Although topic understanding is helpful in assessing the relative importance of certain individuals in the negotiation process, it is prohibitively difficult to realize with current knowledge understanding technology. This difficulty is addressed by specifying issue owners for various stages on the meeting agenda. This mapping should indicate the relative importance of the participant towards the resolution of a specific design conflict.

In one embodiment, the agent behavior is relatively simple. The agent generates a vector representing: (1) the averages of the on-line time each individual has consumed; (2) the amount of recommendations generated regarding a specific intent; (3) the average time a pending speaker waits before he/she is given access to the floor; and (4) the relevance of the topic to each speaker (as indicated in the meeting agenda).

The vector is generated simply by weighting the data elements described and placing the result for each dimension into a vector data structure. Its simply a 4D vector with a weighted element in each dimension generated from the four dimensions described in the preceding paragraph.

At the present time, the facilitator agent only distinguishes between three control strategies: (1) Brainstorming/ Free, (2) Lecture, (3) Chairperson. A weight is assigned to each of the components of the vector described above and the elements are summed. The weights are assigned at a threshold level and are refined through user adjustments or through a regressive analysis or through a more complex learning algorithm. These weights are adjustable by the user. The resulting scalar is thresholded at three levels to indicate the appropriate meeting process that the agent should proceed to These thresholds are adjusted by the computer as the agent interacts with the user and are also manually adjustable by the user.

This approach is not optimal at determining appropriate process intervention moments. However, controlled experiments have shown that the agent has made reasonable process intervention suggestions to the users.

Figure 8:
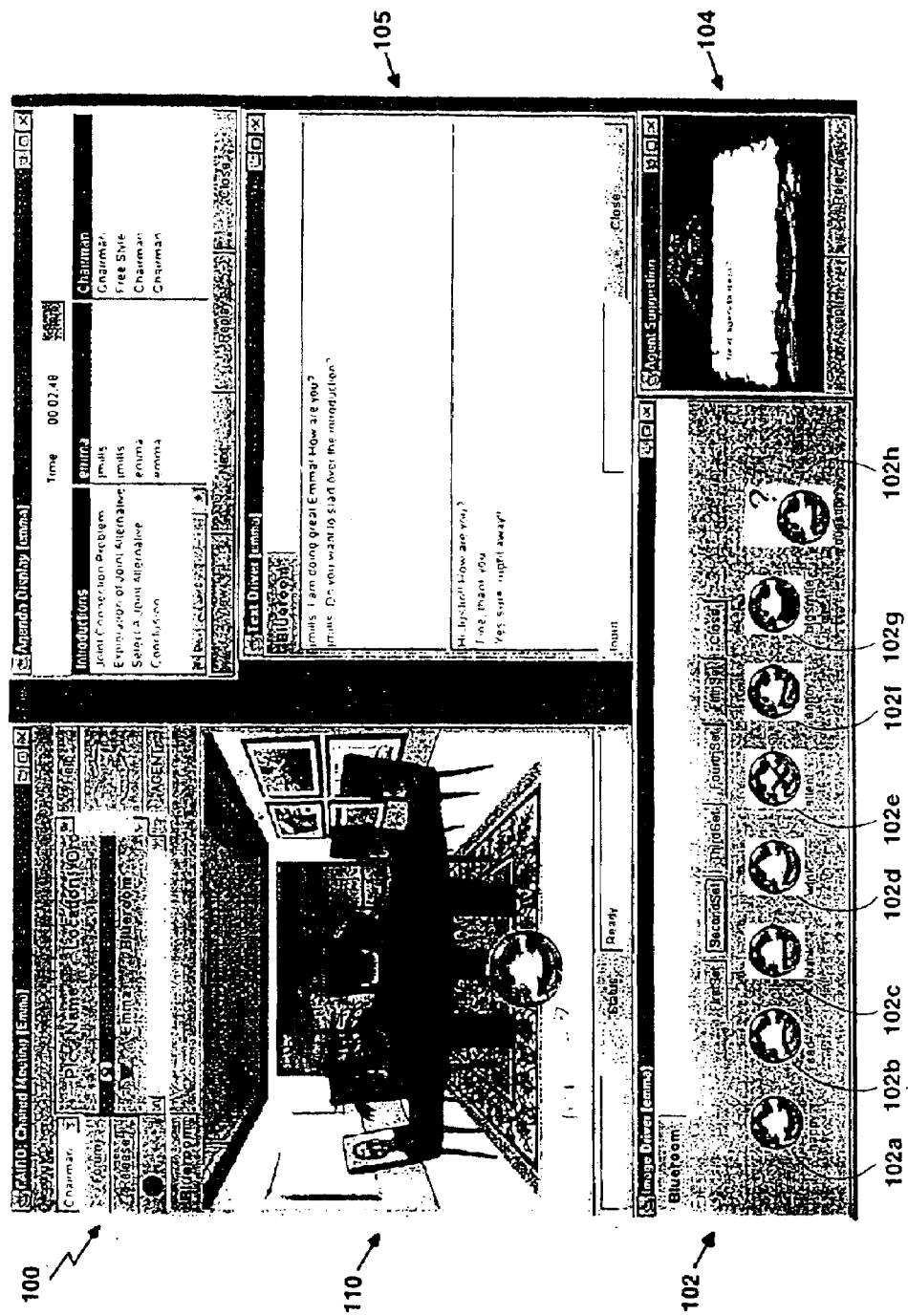
FIG. 8 is a diagram of a social agent.

Referring now to FIG. 8, A forum 100, here set in a boardroom environment 110 includes a social agent 101 and a facilitator agent 104. As has been previously indicated, each participant has an agent that monitors relevant components of the design environment and suggests appropriate actions to be taken by the participant. With continued interaction, the agent learns how to effectively represent each individual within the design environment. Also, the social agent 101 monitors communications to and from its representee. When the social agent 101 detects one or more communications which it recognizes as corresponding to an emotion of the user, the social agent 101 can suggest to the user an appropriate cue in order to reflect the users emotional state. For example a visual cue may be utilizing an icon of a person with a happy or sad face or by changing a color associated with that user. Thus, the social 101 agent can suggest an image (e.g. an icon) or other cue (e.g. audio) which represents the emotional state of the user (e.g. happy, sad, satisfied, concerned, etc. . . . ).

As the agents become more familiar with their representees they can cooperate with the agents of the other conferees to decide upon the appropriate meeting control scheme. The agents reach consensus on a meeting process intervention through a simple majority rule mechanism.

During a conversation, it is an added benefit to understand the emotions of the other individuals. Knowledge of another person's mood can be an incredible asset during an engagement and can in fact lead to a more effective discourse between those involved. Thus, to allow such expression, an Expressions toolbar 102 including a plurality of caricature expressions 201a–102f is used. The toolbar 102 allows an individual using the conferencing system client to change his/her facial features within the collaboration interface to convey to other clients his/her feelings at a particular instant in time. This type of information can be conveyed in a visual fashion so that users do not have to explicitly state how they are feeling. In this particular example, the toolbar consists of a fixed set of images that are either cartoons or simple drawings.

Figure 8A:
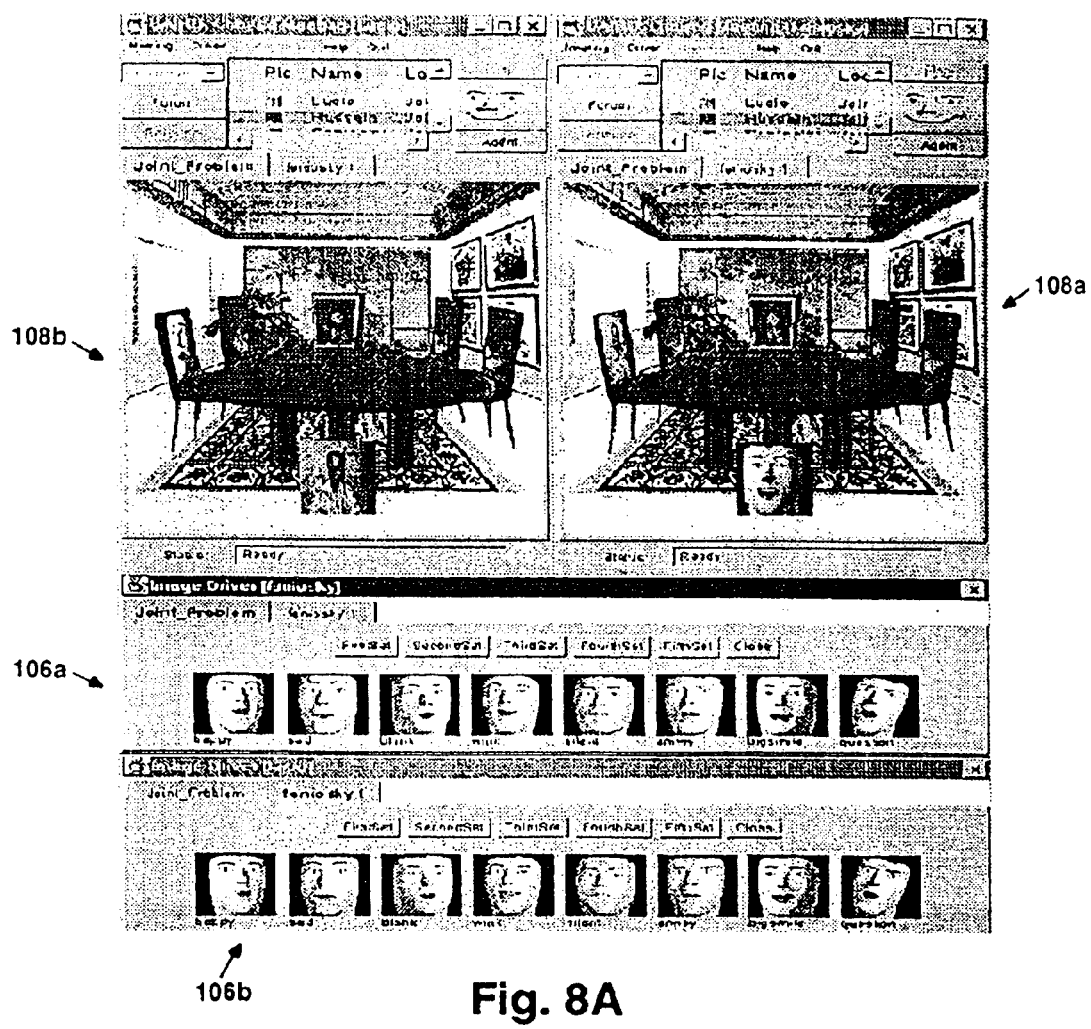

FIG. 8A presents a snapshot of two participants 108a, 108b who have opened their Expressions toolbar 106a, 106b respectively. Participant 108a has chosen a face with a big smile to exhibit his/her satisfaction. However, this functionality can also be utilized by allowing participants to take various pictures of themselves, which can then be used in place of the caricatures shown in toolbars 106a, 106b. In addition, the system has been programmed to recognize a series of emoticons in the text driver. Therefore, a participant can simply use one of the emoticons in his/her text driver and the conferencing system of the present invention automatically recognizes the text and updates the user's image. The Table below provides a list of the emoticons that are currently recognized by the agent.

TABLE

List of Acknowledged Emoticons

| Expressions | Emoticons |
| --- | --- |
| Happy | :-) :) =) |
| Sad | :-( :( =( |
| Blank | :-\| :\| =\| :I =I |
| Wink | ;-) ;) |
| Silent | :-x :x =x :-X :X =X |
| Annoy | :-/ :/ =/ |
| Big Smile | :-) :)) =)) :-D :D |
| Question | ?:-\| ?:\| ?=\| ?:-I ?:I ?=I |

Referring now to FIG. 9 and again to FIG. 3, a model of a design of a tool to support distributed collaborative meetings is shown. The tool provides an environment for structured information exchange across the internet in real-time. The system includes synchronous communication support, coordinated interaction support, system modularity and extensibility with a variety of media and tools, robust and reliable communication, and a multi-user interface for collaboration as described further hereinafter. Information exchanged in a shared environment requires a variety of media. Typical exchanges between members of a group involve speech, gestures, documents and sketches. Such interactions need to occur in real time for an on-line meeting. In an effort to enhance group design and collaboration processes in a distributed environment, the following three objectives have been included in the conferencing system. First, the relaxation of time and space constraints in traditional meeting settings. Secondly, the facilitation of distributed negotiation through the formalization of meeting control methodologies and the application of intelligent agent mechanisms to select the appropriate methodology. Thirdly, the capture of process and rationale that generated a product design through the documentation of meetings.

Figure 9:
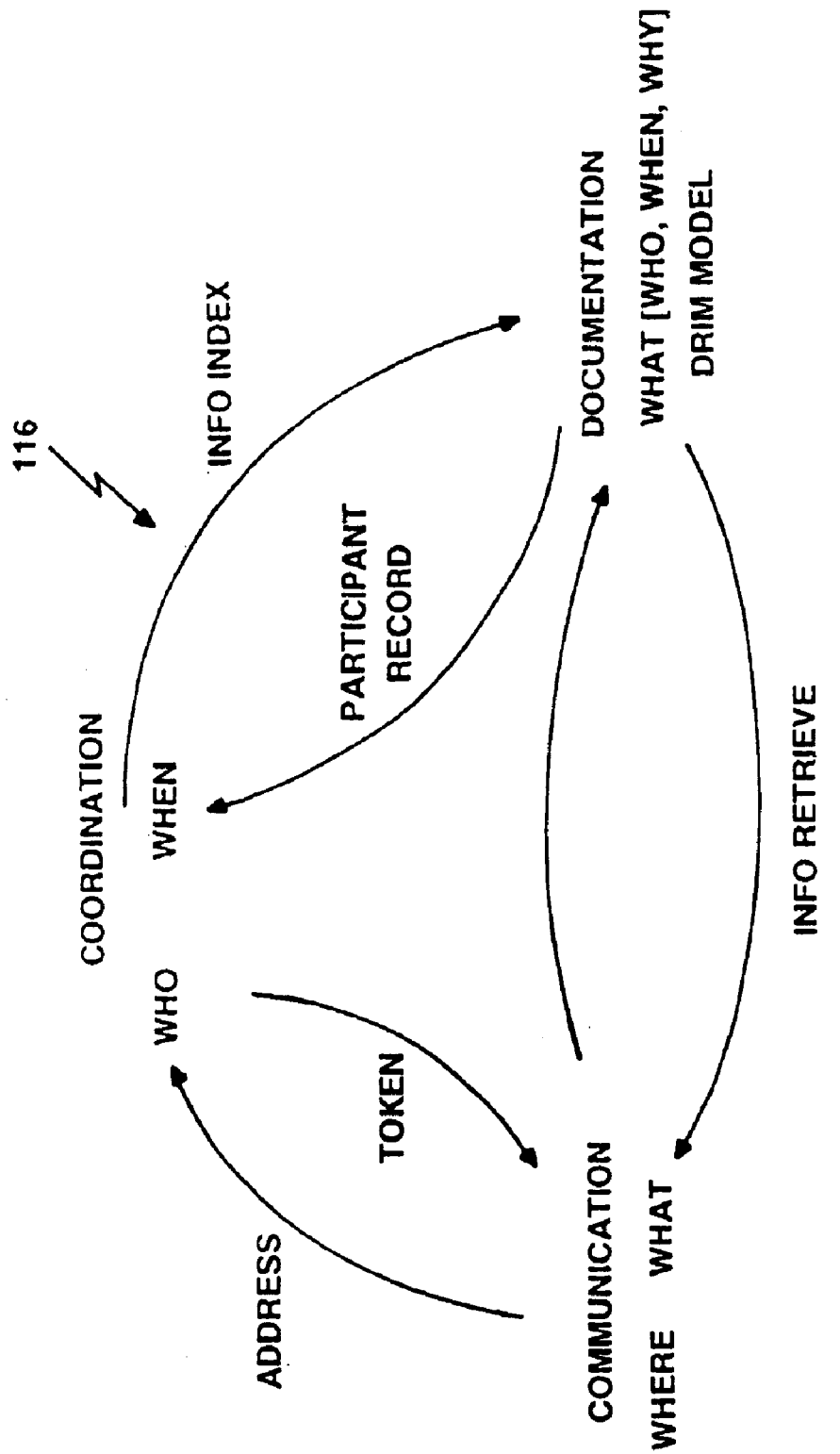
FIG. 9 is a diagram of a collaboration mechanism in a system such as that shown in FIG. 3.

To achieve these objectives a distributed negotiation meeting process is shown to include four critical components: co-location, cooperation, coordination, and documentation. This model maps the necessary physical meeting elements into a general requirement list. These requirements are based on the fact that physical meetings require four key components in order to exist. First, a physical meeting room in which the participant can meet (co-location). Secondly, a common language and a shared understanding of materials to be presented in the meeting (cooperation). Thirdly, an agenda and an individual or set of individuals that ensures the agenda is maintained and the group is focused on resolving the issues outlined in the agenda (coordination). Finally, a Group memory which is comprised of each individual's memory and notes as well as the formally defined group memory incorporated in the minutes of the meeting (documentation). In FIG. 9, the interaction and relationship of the layers of a computer-based conferencing system required for an effective collaborative environment is shown. Co-location involves dealing with the network infrastructure to provide seamless communication among distributed clients in a conference. This layer should provide naming services to identify client locations as well as interaction with the network protocols to transmit data across the network between the clients. Cooperation involves the sharing of information among clients in a team. Due to differences in software and capabilities of the various clients, translations need to be performed in order to provide a coherent view of the data among the clients. Coordination involves control of the work flow and communication process. This allows for efficient control mechanisms to coordinate group effort. The coordination layer acts as a "virtual manager" of the conferring clients. Documentation involves the capture and storage of conversation elements exchanged during a meeting. The documentation process provides a mechanism for the retention of group memory.

Figure 10:
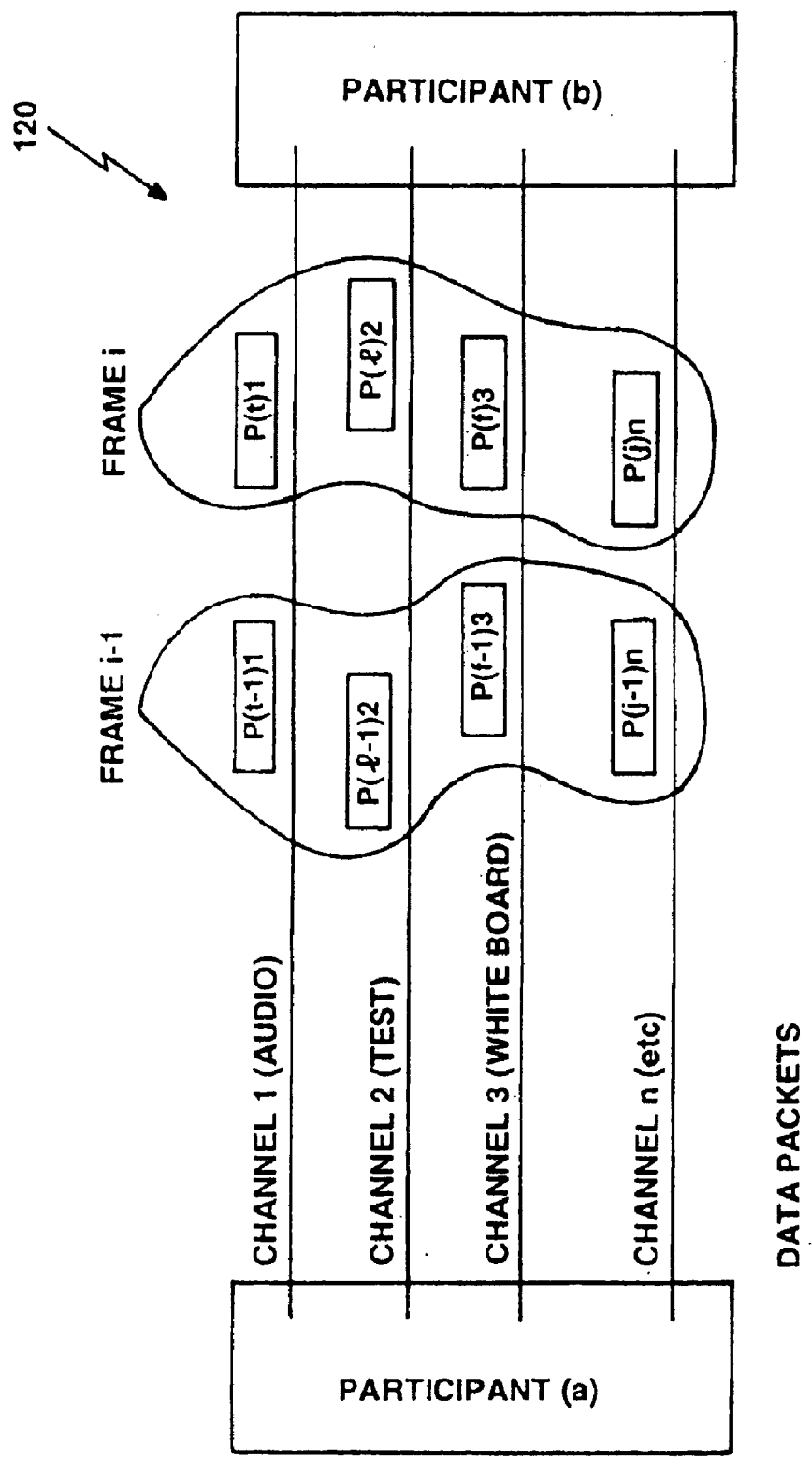
FIG. 10 is a block diagram of a synchronization system between two conference participants is a system such as that shown in FIG. 3.

The internet is a collection of interconnected nodes (machines) that interact via a common protocol that is TCP/IP. Due to the nature of the protocol as well as the packet transmission and routing mechanisms prevalent on the internet, the internet is a non-deterministic network. Hence, inter-packet arrival time is unpredictable due to varying network traffic. In a real time application, i.e. an application with pre-specified time dependence, such random delay patterns can render the application ineffective. Insuring real time communication via the internet requires a series of delay compensation techniques. These heuristics reduce the amount of variability in the underlying network as well as provide the end user with near real time performance. Synchronization of the various media inherent in a multimedia conference requires real time scheduling support by the conference support tools. Most current operating systems do not provide adequate support for real time scheduling. Real time system theory addresses the scheduling of multiple independent channels or streams of data. As shown in FIG. 10, these channels may have unpredictable arrival rates. Real time scheduling assures that all media channels are communicated within a given time period or frame, eliminating potential "lip-sync" effects. Due to the possibility of losing packets or delays in packet transmission by the medium, a queuing mechanism is provided to enforce the real time constraints.

Figure 11:
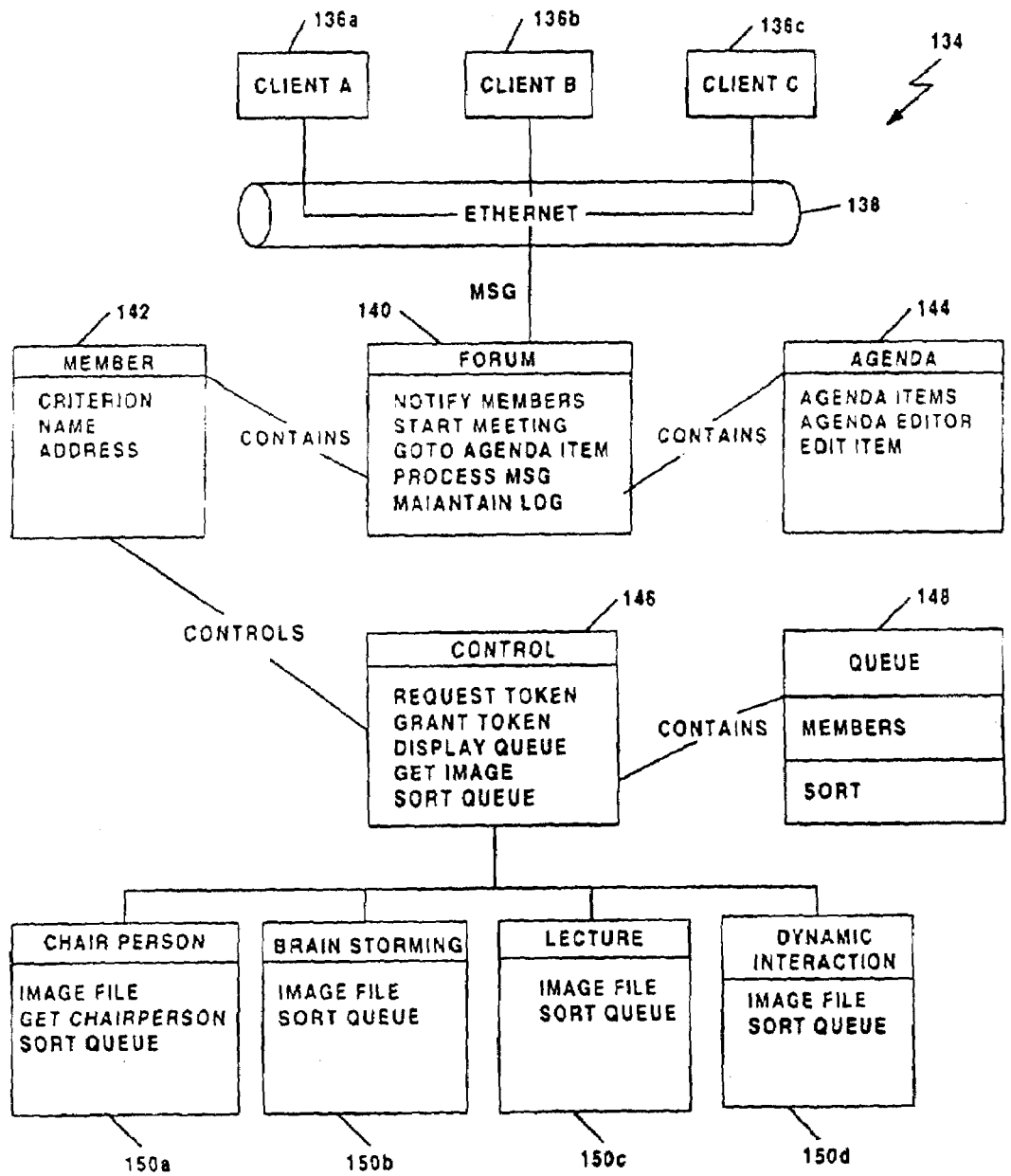
FIG. 11 is an object diagram of a control infrastructure.

Referring now to FIG. 11, a control infrastructure model is shown to control the various portions of the conferencing system in order to support both individual interaction as well as process control in group interactions. A forum server 140 acts as the communication control mechanism from the conferencing or conferencing system. The forum server's primary function is the allocation of communication channels among individuals in the group, here client A 136*a*, client B 136*b* and client c 136*c*. Communication among individuals, here client A 136*a*, client B 136*b* and client c 136*c*, is not channeled through this server but is rather controlled by the forum process. Forum processes are initiated by a forum manager tool that allows the definition of meeting membership, meeting control strategies, meeting agenda and meeting notification. The meeting may be defined as open (i.e., any person can enter the meeting room) or closed in which all participants in the meeting must be predefined in the agenda tool 144. Each meeting member is also assigned particular access rights that include: agenda editing, chairperson control, and control of the meeting proceedings as shown and represented by member box 142. The agenda tool 144 is also used to define the meeting agenda items which are each assigned a floor control strategy by the meeting initiator. Once the agenda is complete, the system automatically sends notification messages to the participants and a forum server process is created with the appropriate membership and agenda. The forum class 140 processes messages from the client systems which represent each participant in the meeting. The forum class 140 is also responsible for maintaining meeting membership and temporal control of the meeting. This includes meeting notification, agenda traversal, and maintaining and traversing meeting logs. Communication requests received by the forum class 140 from the clients 136*a,b,c* are handled by one of the subclasses of the control class 146.

The Control class 146 include functions to manipulate tokens and manipulate the speaker queue 148. The speaker queue 148 includes all members that are interested in acquiring the floor. The ordering of the queue 148 is based on the particular control strategy used including chairperson 150*a*, brainstorming 150*b*, lecture 150*c* and dynamic interaction 150*d*. For example, the chairperson 150*a* strategy would allow explicit ordering of the queue by the chairperson. The brainstorming 150*b* strategy would simply be a first-in first-out (FIFO) queue. Ordering of the queue 148 can also be based on more complex inputs provided by the user interface mechanisms described hereinafter. The token control mechanism and the forum processes are described in further detail hereinafter.

The conferencing system also provides documentation. Documentation of meeting proceeding provides two purposes. First, providing a convenient snapshot of negotiation proceedings for late participants or for follow-up meetings, and second, retain group memory by saving design rationale knowledge encoded in the speech exchange during a negotiation. Two key mechanisms have been designed to support negotiation documentation requirements: Conversation indexing mechanisms and Conversation browsing tools. For the benefit of information retrieval and the retention of a meeting context for time-delayed participants a conversation model has been developed. The model is based on the four critical dimensions of design negotiation conversations: Problem space/Product-Process model, Information flow, Authority and role of participant, and Absolute time and time dependence among conversation elements. The conversation model provides a basis for indexing the free-form conversation occurring in a typical meeting event. The model is further refined by incorporating a semi-structured design rationale model that includes designer intent, recommendations and justifications. This model supports both structured and unstructured design rationale data.

In the conferencing system, to represent conversations in negotiation, the system includes an intent (shown as a rectangle), a recommendation (shown as a rounded rectangle) or a justification (shown as an elongated hexagon). Each of these boxes contain several words that describe the conversation clip. Clicking on the box will cause a multimedia presentation of the issue to appear on the system console.

A combination of an index and a causal/temporal model of the interaction is used to generate a directed graph of the proceedings of the meeting. Such a graph forms the core of the user interface and allows quick visualization of the meeting proceedings. Users can then browse the conversation data based on a single graph or on the intersection of several graphs. For example the user may wish to look at all conversations regarding the functional specification phase (according to the process model) of a specific joint (from the product model) generated by the mechanical engineer (from the designer index). The scope of the graph can also be limited in accordance to user preferences derived by an intelligent user interface agent currently being developed.

It should be appreciated that social interaction and meeting control strategies must meet user approval to provide a sound basis for a communication tool to be effective. At a minimum, multiple media channels are required since group communication is generally comprised of audio, textual, and visual data. Multimedia channel synchronization is essential due to random delays inherent in the underlying network. A conference control mechanism is required to provide efficient group interaction. The system must be adaptable to different conference styles (from informal, unstructured conversation to a stringent and formal conversation control mechanism). Ability to support groups in the various stages of formation, i.e. the ability to have hierarchically structured groups that are easily expandable. Ability to retain group memory to build corporate experience as specified by the adjourning phase in the group life cycle.

As shown in FIG. 3, the conferencing system includes several interlinked modules and servers. Each participant engaged in a collaboration conference spawns a Collaboration Manager (shown as a dashed box) which is comprised of media drivers (shown as pictograms of the media, i.e. video camera, microphone and X display, and message servers (indicated by the acronym 'MSG'). The message servers package data for transmission over the network and enforce synchronization constraints during media play-back. Forum servers are processes that maintain control of a conference among several individuals and enforces membership constraints. Furthermore forum servers log all conference proceedings. Forum servers are spawned by forum managers (not shown) that define a specific control methodology. Forum managers also provide mechanisms for converting a forum server's control strategy. Finally, the name server maintains a directory of all participants, forum managers and forum servers within the conferencing system. It allows each participant to easily address any other member or forum in the conferencing system.

Figure 14:
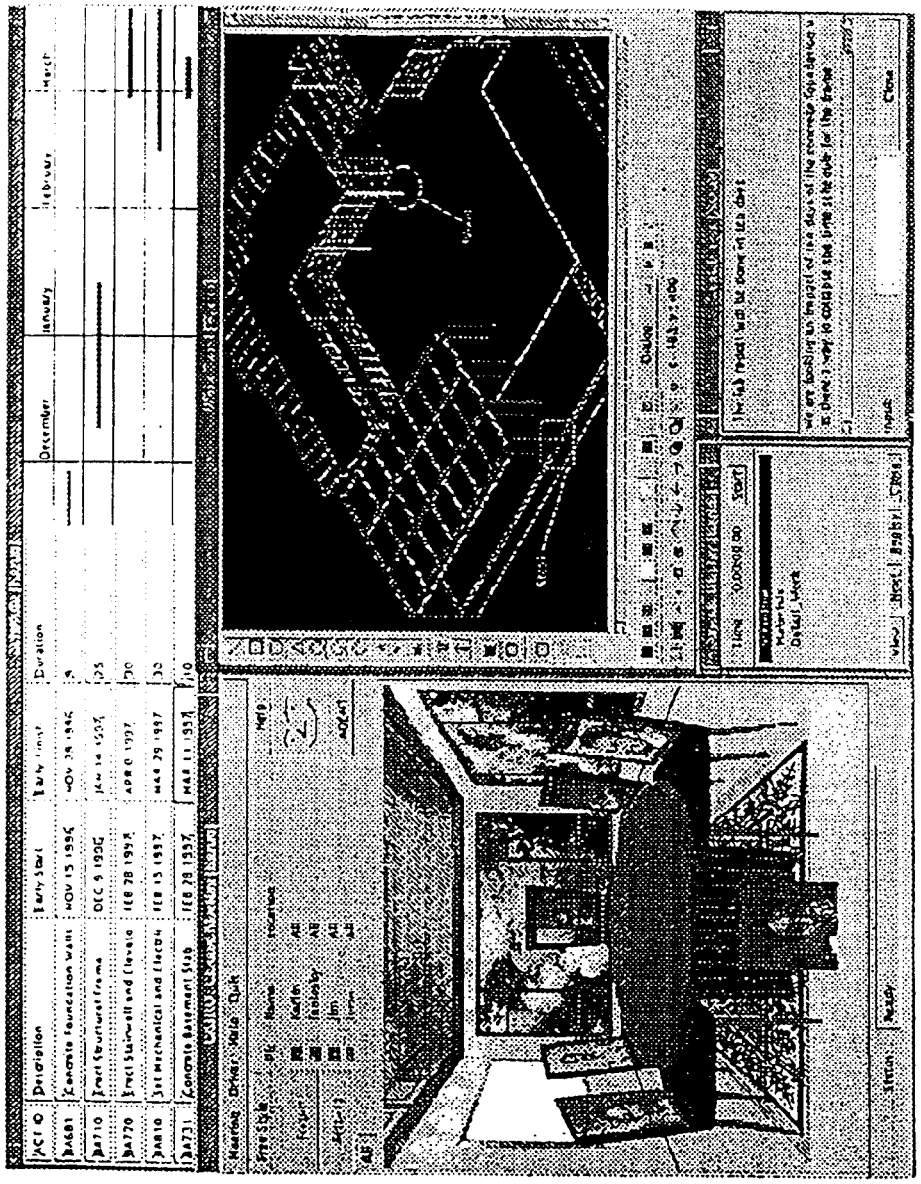
FIG. 14 is an image representing a user interface including a control panel.

The Collaboration Manager incorporates the user interface and maintains lists of available media resources and forum servers as shown in FIG. 14. The Collaboration Manager also has a snapshot facility that allows each participant to retain portions of the meeting for his/her own personal notes. It also enforces conference controls associated with the forums in which the user is participating. For example, a specific forum may not allow any conversations with users outside of the forum or may not permit any private side conversations with other members of the forum. Media drivers handle all VO interaction between the multimedia conferencing system and the underlying media channel. Each driver is tailored specifically to the underlying media represented. Each driver is responsible for data acquisition and frame compilation for transmission and replay. This module must also provide the multimedia server with synchronization information, frame size, and delay and error tolerances. Several media drivers have been implemented that enable distributed schedule coordination, shared whiteboards for sketching, a text tool for chatting, and audio and video drivers using Microsoft NetMeeting technology.

Figure 12:
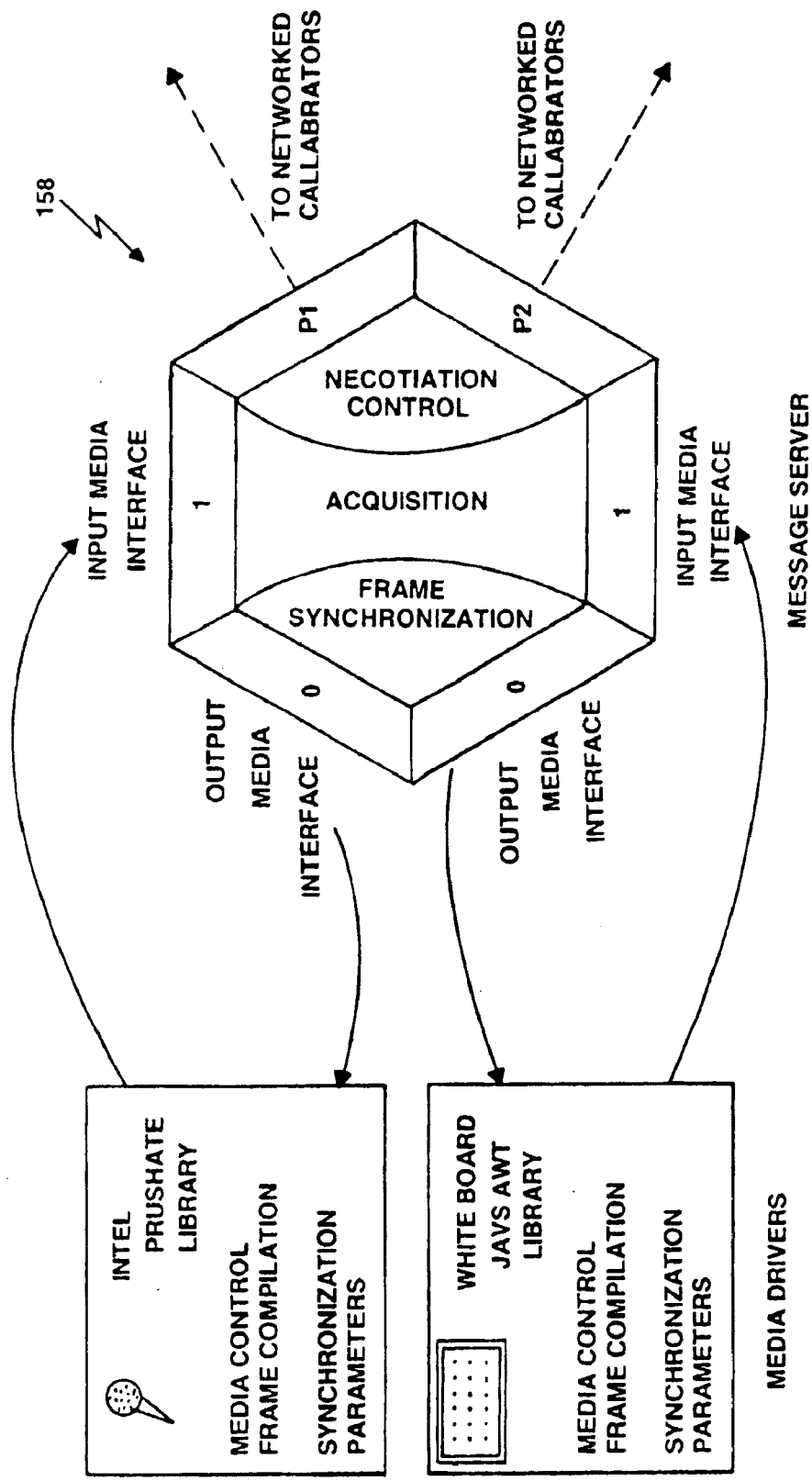
FIG. 12 is a diagrammatical representation of media frame synchronization.

The conferencing system is designed to support multiple media channels in a conversation. As described hereinabove in connection with FIG. 10, due to delays in the transmission of the packets across the internet, packet arrival times are unpredictable. Therefore, each multimedia frame does not arrive at the destination as one chunk. The receiver must then reassemble the frame and ensure that play-back of the frame is synchronized such that it reflects the initial input from the source. Referring now to FIG. 12, an overview of the media channel synchronization subsystem is illustrated. Media synchronization is base on the synchronization parameters supplied by each media driver. Each media driver also supplies temporal relations with respect to the other media drivers in the system.

Given these parameters, the system can compensate for skews in the delivery time of messages. A synchronization engine combines the synchronization heuristics and parameters to play-back the multimedia data to the receiver in as similar a form to the original data. Each channel in a multimedia conference must include a parameter that describes its temporal relation to each of the other channels. As each media device registers with the message server system $158$, it is checked for consistency with the preferred parameters. Once all task computation times and deadlines are determined the scheduler operates on an earliest deadline first policy. That is within a given time unit the highest priority tasks to be scheduled are those that have the highest period.

Multimedia frames transmitted by a source participant are encoded with a frame sequence number and a time stamp. Furthermore, the initial and final frames in a conversation are uniquely tagged to aid the synchronization and scheduling mechanism. Temporal constraints are encoded with respect to a single frame. Each frame is composed of multiple channels of media data for a given period of time. In order to ensure the arrival of all packets in a single frame, a delay in play-back at the destination is introduced. The conferencing system 30 enforces a delay of 0.5 seconds although this may be varied as the network infrastructure changes. The synchronization engine enforces three types of temporal constraints: before, after, and during. All three constraints are determined on the transmission side and the appropriate frame sequence numbers are chosen for each channel to reflect the constraint. For example, if text was required to appear after audio, and audio was sampled in frames i to i+10 then the text sequence number would be i+11.

All packets arriving on the receiving end are placed in an input buffer queues by the media drivers. The queues store up to fmax frames (fmax=100 in the conferencing system prototype). Incoming data is placed in the queue according to the frame sequence number. The queue index is equal to the frame sequence number modulo fmax. Each media channel has its own queue structure, e.g. audio queues have 10 audio clips per queue element, text queues have 1 string per queue element. The queue structure is a list of lists. The top-level list is indexed by sequence. For each sequence index in the top-level list a secondary list contains the media packets indexed by source (this allows a receiver to listen to data from multiple sources). Hence, a single sequence index can be associated with multiple elements. Each element in the queue is also tagged with a time-stamp and a source specification.

Referring now also to FIG. 13, a scheduler 168 operates on the basis of frames. The scheduler 168 is invoked periodically based on the frame time-out period. The frame time-out period is arbitrarily set at a 14 second. Each frame contains several packets on each media channel. At each interval the scheduler 168 polls each queue and retrieves a list of complete frames. If a complete frame exists and it is has the smallest sequence number the frame is scheduled for replay. However, if the frame with smallest sequence number is incomplete, the scheduler employs an applicable delay compensation heuristic. If none of the heuristics are applicable the user is notified that the communication channel can not support the quality of service requested and suggests decreases in the quality thresholds. There are two exceptions to the behavior of the scheduler 168. There are two special frame identifiers, initial and final. The scheduler 168 should not replay a frame unless three frames are available for replay, unless the final frame is among the last three frames. This buffering of frames ensures that data will usually be available for replay at the frame time-out. The synchronizer then takes a single frame and passes it on to the real time scheduler. The scheduler 168 then posts the appropriate events to replay the frame. The events are posted based on an earliest deadline first policy. The scheduler is implemented on top of the X event handler.

The conferencing system 30 maintains the input and output buffers and ensures that all channels are assembled before play-back by the media drivers. In FIG. 13, the essential functionality of the synchronization engine as well as its relation to the input queue and multimedia frame output queue is shown. A multimedia frame output queue stores multiple frames prior to transmission on the ethernet. This is required to allow for complete channel frame transmission. An input media channel queue provides storage of incoming data packets on each media channel. These are stored until they can be compiled into a multimedia frame. A connection manager takes care of low level calls to the TCP/IP layer for maintaining socket connections and sending datagrams across the internet. A correspondence cache maintains a cache of addresses associated with all participants the user will broadcast to given that he/she is a member of a specific forum. Update requests are periodically transmitted to maintain cache coherence between the forum server and multimedia message server. All messages are TCP/IP datagrams and are asynchronous. Each component of the system has an interrupt handler that manages incoming and outgoing messages and appropriately routes the messages to the appropriate objects.

Referring to FIG. 11, forum managers contain information on a particular type of meeting. They spawn off instances of forums that comply with the forum manager control mechanisms but with varying memberships. Currently, four such forum managers have been included in the conferencing system however the system is extensible and additional forum managers need only comply to a predefined message protocol. Control 146 controls various control modes and the underlying primitive control structures that are required and among the necessary provisions are membership request processing, membership grant, token request, token grant, as well as participant privilege explication. These parameters allow a forum manager to specify membership constraints as well as floor controls for a conference. A forum is a structured group of participants involved in a collaborative effort. The forum server maintains a list of all participants in a specified forum as well as the privileges associated with each participant.

Each forum member is listed in one of three states in the forum: active (logged in and listening to conference), speaking (actively participating in conferencing, i.e. has control over the floor), or non-active (not logged in and not receiving any conference communications). Forum servers have two key functions: subscription control and speaker control. Subscription control may be a predefined list of allowable conference participants or it could be through a vote by existing participants or it may be a forum maintainer with the right to revoke and grant membership to potential members. Speaker control is the process by which a forum server maintains an orderly conversation among the members of the forum. Speaker control or floor control of the forum is achieved through the granting and revoking of conversation tokens as described herein.

All restrictive controls on the participants in a forum are provided via token access. A Collaboration Manager (not shown) cannot issue any communications without having received a token granting access privilege to that specific speaker. Token controllers on both the Collaboration Managers and Forum Servers must be secure and trusted code. Forum Servers issue two commands related to tokens: a Grant Token command (specifying write or read rights to a communication channel with another participant) and a Retrieve Token command (retracting read or write rights specified by a Grant Token). The Collaboration Manager responds with an Accept Token or Reject Token message depending on conflicts with other active forums on that user's workstation (e.g. engagement in another forum that does not permit multiple parallel forums). Tokens have internal time-out counts after which tokens expire. Specialized tokens denote ability to participate in side conversations, external conversations, and interjection rights. These side and external conversation tokens can be used to maintain confidentiality within a conference and to minimize group distractions. Interjection tokens allow for emergency situations. Tokens are granted upon request submitted to the Forum Server by the Collaboration Manager. Such tokens can be granted automatically using a predetermined computer moderation scheme or can be granted manually by a moderator. Furthermore, conference logging is achieved via a specialized token requesting communication sent to the Forum server where all interactions are logged for future browsing and editing. This mechanism provides a process history support. The token structure provides a centralized control yet distributed communication structure for conferencing. Hence, all high bandwidth communication is decentralized and direct, while all floor control requests are centralized by the forum server.

Structuring and control of group meetings enhances the efficiency of a collaborative team. Forums maintain a conference among individuals. Each forum is associated with a forum moderator that defines the control behavior of the conference. The forum server processes requests for membership to the forum as well as requests to speak by participants within the forum. As shown in FIG. 2, a forum is comprised of individuals and other forums. The forum Management that is a member of another forum Project must be at least as restrictive as the forum Project. Any restrictions on membership and communication must be upheld by the child forum, Management.

During a meeting or conversation a particular participant can be in one of three states: active (i.e. speaking or demonstrating), pending (i.e. awaiting his/her turn to speak), or inactive (i.e. passive observer or listener). Each participant's state is relative to a specific forum and is stored in the forum server. The Speaker Request is equivalent to a professional raising his/her hand in a meeting situation. It indicates to the forum moderator and to the other members of the forum the participant's intent to speak. A speaker request is accompanied by a qualification of the speech act the speaker intends to perform. The forum server would then place the participant on a list of pending speakers depending on his/her qualifications. In a democratic forum a participant becomes active if a majority agrees to his/her request to speak. Furthermore, the computer can automatically moderate (i.e. choose the active speakers from the pending queue) a forum based on pre-compiled speaker qualification data. Interjection is a mode of conversation in which the participant can interrupt an ongoing conversation for a limited amount of time.

Group meetings can take on multiple characters and structures. Group formation and meeting cycles require various group control procedures and paradigms. A list of primitive controls on each forum from which a more complex collaboration control mechanism may be devised shall now be discussed. The forum creator may choose to override any of these primitives for a particular forum member. A Chairperson is a designation of a participant or group of participants who hold a privileged status within the forum. They may preempt speakers and arbitrarily choose active speakers. They can control interjection duration which is a parameters specified for a forum being the length of time allowed for interjections. An interjection time of zero indicates no interjections are allowed. Conversely an infinite interjection time allows for complete unstructured free-form conversation. Maximum speech duration is a parameters specified for a forum being the length of time allocated to a single member to hold the floor of the conference. Maximum number of active speakers is a parameter that indicates the number of concurrent speakers allowable during the conference.

Side Conversations are two-way or multi-way conversations among a subset of the forum members. Forums may be created that do not allow such side conversations to exist. External conversations are conversations between a member of a forum and other non-members while a forum is active. This form of conversation may also be restricted by the forum. Currently the conferencing system only provides either continuous logging or no logging at all of the ongoing conference. Speaker evaluation is a voting mechanism that has been implemented to evaluate participant acceptance of a specific topic or to determine participant value to a conference. The results of this evaluation may be used to determine the order of speaker priority for a conference. Speaker ordering is the ordering of the pending speaker queue which may be on a first come first serve basis or other evaluation criteria. These include: ordering of speakers based on value determined by the participants, as described in speaker evaluation; or ordering based on chairperson choice in a chairperson controlled conference. This control mechanism provides for free form and structured conferencing. The collaboration primitives discussed above are combined to form a collaboration scheme or mechanism.

The conferencing system can easily be extended to provide many different collaboration schemes. For example, Free is all participants may talk at any time. Completely uncontrolled all speakers may speak at once. That is Chairperson='none', Side Conversation=ALL, External Conversation=ALL, Speaker Ordering='first-come first-serve'. Democracy is the choice of the active speaker is based on a vote by all other participants. That is Chairperson='none', Side Conversation=ALL/NONE, External Conversation=ALL/NONE, Speaker Ordering='highest vote'. Chalk-Passing is the last active speaker chooses next person to be a designated active speaker. Each speaker may only speak for the time allotted by the Maximum Speech Duration parameter specified above. In this mode: Chairperson='last speaker', side conversation=ALL/NONE, external conversation=ALL/NONE, Speaker Ordering='chosen by chairperson'.

Chairperson Control is a specific privileged participant (Mr. X) has the ability to choose the participant who should address the conference at any specific time. In this mode: Chairperson='Mrs. Q', side conversation=ALL/NONE, external conversation=ALL/NONE, Speaker Ordering='chosen by chairperson'. Modified Delphi is where the system polls all participants in the collaboration on their views regarding a specific problem. The results are compiled and presented to the conferring experts and the participants are then re-polled. This process is repeated by the questioner until the experts provide a consistent analysis. The Delphi method is used extensively in polling experts on directions in hi-tech industry. In this control strategy there exists a moderator as well as a questioner. A quicker more dynamic method using our collaboration methods is proposed. In this mode: Chairperson='moderator/questioner', side conversation=ALL/NONE, external conversation=ALL/NONE, Speaker Ordering='round robin'.

As shown in FIG. 3, the name server 32 is an independent server that acts as a global directory for the collaboration conference system 30. The following information is stored in the name server for each participant and each forum and may be queried by any participant or forum server. (i) The Participant Name and Location including media driver locations and media descriptors. (ii) Participant Status recording whether each participant is either in an active or non-active state. Active denotes that the user is logged into the conference system 30 via a Collaboration Manager on his/her workstation. Non-active status is given to users who are subscribers to the conference system 30 but are not reachable. (iii) Forum Manager Name and Location including a brief description of control style. (iv) Forum Name and Location including a listing of shared media drivers. (v)

Forum Status recording whether each forum is either in an active or non-active state. Active forums imply a conversation is occurring among the participants of the forum. Non-active forums are structured meeting skeletons with membership lists for a meeting that is not currently in session.

The collaboration control manager of the conferencing system 30 includes several interacting servers and modules. A brief description of the operations of these modules/servers will now be discussed. Forum Creation is where a forum is initiated by invoking an Forum manager. The forum manager tool can be invoked by executing the appropriate forum manager program or by choosing the New Forum command from the control panel menu 180 as shown in FIG. 14. A series of dialog boxes and menus then guide the forum initiator through the creation process. As described earlier, FIG. 6 shows the forum manager user interface.

The forum creation process involves specifying the group primitives described earlier as well as specifying the members of the forum and their associated privileges. The specified parameters are then stored in a forum specification file that is used by the forum server when instantiated. Forum managers can also be used to transfer an existing forum from one control mode to another. The forum manager loads the forum specification file from the existing forum and prompts the user for any additional information required by the new forum control mode.

Forum Servers are initiated by forum managers. As described earlier, forum managers extract the necessary parameters for forum instantiation from the forum creator. The forum manager stores all parameters in a file according to a preferred format. The forum server is then started as an independent process. Upon startup the server reads the parameter file and initializes all internal objects accordingly. The server then registers itself with the name server. It is then ready to accept any login or membership requests from users of the conferencing system 30. The forum server maintains a membership list that includes an identification of each member's state. A forum member can be in any of the following four states: Member, Logged In, Waiting to Speak or Speaking. A Member is a user that has been specified as a person who is allowed to join the forum. Logged In (or active) is a user who is actively engaged in a forum discussion. Waiting to Speak is a user who has requested the right to speak but has not yet acquired the enabling token. Speaking is a user who has the floor (i.e. the user possesses a speech token) and has the ability to transmit information to any number of forum members. Each state described above assumes that the user was in the preceding state before transition.

Users of the conferencing system 30 must each start a collaboration manager (CM) process on their workstations. The manager provides an interface/control panel to the distributed collaboration conferencing system or conferencing system 30. Upon startup, the CM registers with the name server. The CM then requests a list of the available forum managers and forum servers from the name server. Finally, the information is displayed in the first two list boxes in the control panel 180 as shown in FIG. 14. The control panel 180 also provides the following functionality: (i) Local conference logging control (including recording and retrieval); (ii) Screen capture; (iii) Forum server creation via the forum managers; and (iv) Instantiation of media drivers according to the local workstation's capabilities.

Once the two key components (i.e. forum servers and collaboration managers) are running, conferences can be started on the conferencing system 30. The initial step in entering a conference is accessing a specified forum. This can be done by clicking on the appropriate forum name in the forum list box in the control panel 180. Once a forum is selected a login message is sent to the forum server, whose address has been supplied by the name server. The forum server then determines if the participant logging in has the appropriate access rights (i.e. the participant is on the membership list for a closed forum). An acknowledgment is returned to the collaboration manager if the user has been successfully logged in, otherwise a rejection message is transmitted to the user. Furthermore, if the login was successful, the forum server's active list is updated and all active members of the forum are informed of the addition to the community.

The active member list box on the right side of the control panel 180 shows the currently logged in members of the forums highlighted in the forum list box. As described in the section above the forum server automatically updates all active members when any forum members have logged in or logged out.

When Requesting to Speak, speech requests on the conferencing system 30 involve two steps: selecting the audience and describing the speech intent. Audience selection simply involves selecting the appropriate recipients from the active member list box on the control panel 180. Forums that do not allow side conversations will automatically have all items highlighted in the active member list box. A speech intent is indicated by pressing one of the speech request buttons. As soon as a speech request button is depressed token requests are sent to the forum server. A token request is sent for each highlighted member in the active member list box. The forum server then processes the token requests. The server's response is dependent on the forum control mode that is encoded in the forum server. According to the control mode the forum server decides whether to place the speaker request on the pending queue or to automatically grant tokens to the requester. For example, in a chairperson controlled mode, all requests are placed on the pending queue. When the chairperson allows a specific user to speak, his/her name is transferred from the pending queue to the speaking queue and tokens are granted to the user. Any changes in the contents of either the pending queue or speaker queue are automatically broadcast to all members of the forum.

Once the previous steps have been completed successfully (i.e. a participant logs onto an existing forum server and is granted one or more communication tokens) real time multimedia information can be shared with other members of the forum. The user can then use any of the media drivers available (i.e. audio, text, X whiteboard) at his/her workstation to send data via all connections for which the user has tokens (the tokens act as keys that unlock a point to point connection). The data generated by the drivers is transformed into TCP/IP packets and tagged with a time stamp and frame sequence number. The data receiver then replays the packet as per the algorithm described earlier. It should be appreciated that all conference communication and control mechanisms described above are generic and can be applied to any conference control scheme. Although only a limited set of control modes has been discussed, simple tools are provided for control mode extensions to the conferencing system 30. Furthermore the tokenized control mechanism described is highly efficient and eliminates any bottlenecks associated with a centralized communication and routing center.

Developing a user interface for distributed collaboration required a detailed study of the purpose and use of the system. The experiments conducted in group design processes provide a baseline to measure how closely the system developed conveys the information exchanged in a meeting (written, vocal, gesture and physical actions). The primary function of an distributed interaction interface 178 as shown in FIG. 14 is to convey the actions of others engaged in the distributed conference. Awareness of the state of conferring individuals and their respective ownership or generation of shared objects is necessary to keep track of the interaction in a non-physical setting. Who is doing what? Who is gesturing? Who is pointing? Who is signalling? Who is working on an artifact? Whose video image is this? Whose cursor is this? Whose voice is this? Where in an artifact are people working? What is the emotional state of individuals? Member actions? Who has been there? Who is there? Who is coming? Who is where? Are you aware of what I am doing? Membership awareness? Who owns artifacts? Who can access artifact? Who can change an artifact? What artifacts are being worked on? What roles are there? Who is playing what role? What are related roles? Who is interested? Who wants to speak? Who is speaking to whom? What type of protocols exist? What is the current protocol? The latter represent the requirements for a user interface for a conferencing system 30.

Representing all four dimensions of awareness is a formidable task to accomplish within limited screen real estate. The choice of metaphor for representation becomes critical to reduce the cognitive demand on the system users. The conferencing system does not address all the awareness questions presented above. However, a large portion of the critical questions are addressed in the interaction metaphors provided by the conferencing system 30.

The conferencing system 30 is implemented using metaphors chosen of combine elements from the physical setting (i.e., a meeting room) with standard "window" metaphors that are prevalent in modern operating systems. These metaphors were chosen to provide simple cognitive mappings between the intended use and the concept represented by the interface metaphor. In determining the metaphors for group engagement several criteria were examined including expressiveness, naturalness, input mapping, transparency and dynamism. Expressiveness is the degree to which the metaphor embodies the action or control represented and does not project any unintended meaning. Naturalness is the extent to which the metaphor complies to typical conferencing norms. Input mapping is the degree to which the metaphor can be logically mapped to keyboard strokes, mouse movements or any other generic input device. Transparency is the metaphor must not interfere with the task in which the conferees are engaged. Transparency in the interface also implies that the conference controls occupy a small section of valuable screen real estate. Dynamism is the interface must represent the dynamic nature of the group interaction. The controls can not be binary since the speaker state is not binary. A three dimensional interface is preferred to indicate the spatial relationship among the conferencing individuals. The initial interface was two dimensional, however, that system limited the representation of gaze and addressing in the control space.

Metaphors were derived for the following concepts: Meeting entry and exit. Floor State; Member State and Addressability; Focus of Attention; Degree of Engagement; and Gaze/Addressability.

Figure 15:
FIG. 15 is a diagrammatical view of a meeting entry/exit interface

Meeting Entry and Exit includes a hallway metaphor 184 as shown in FIG. 15 to represent the multiple meetings available on the conferencing system 30. This provides a simple metaphor that maps virtual distributed meetings to physical doors and hallways. This metaphor can be extended to include meeting hierarchies that include floors, buildings, blocks and cities. We have found no need to provide such a degree of hierarchy although if the system is scaled to a large organization such structures may be necessary. The doors in the hallway represent an individual distributed meeting. The door metaphor provides additional queues regarding meeting structure. A padlocked door indicates that the particular meeting has restricted membership. A red tab on the door indicates whether a meeting is currently active and the window at the top of the door indicates the number of people in the meeting. Finally, a descriptive name for the meeting is placed above the door.

Figure 16:
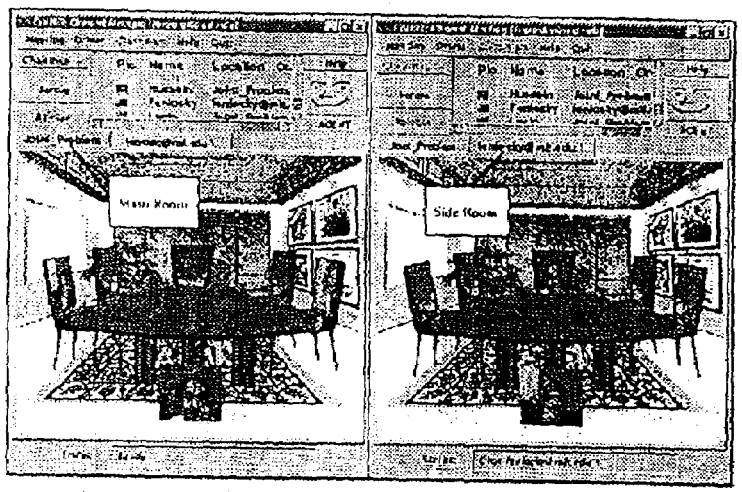
FIG. 16 is a diagrammatical view of a meeting with side conversations.

The Floor State metaphor has multiple representation in the user interface 190 as shown in FIG. 16. The item list at the top of the interface shows the current members of the conference and highlights pending and active speakers. Furthermore, the images of individuals in the interface are appropriately highlighted to show their different states. Additionally, the floor can be split into multiple "virtual" rooms. This allows individuals to create sub-meetings or side chats within the main meeting. Side chats are shown as tabbed folders in the meeting interface.

Member State and Addressability is accomplished by several mechanisms which are employed to describe the distributed member state. Members choose the people they are to address by clicking on the appropriate members or clicking on the table to speak to everyone.

Figure 17:
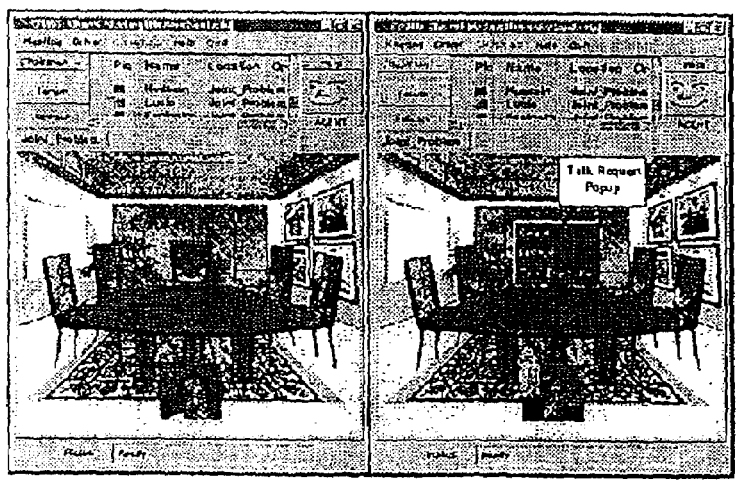
FIG. 17 is an image representing a speaking request.

FIG. 17 shows Feniosky requesting to speak to the group. As shown on the user interface 200, once a speech request is made, the pending speaker is shown by red highlighting of the name and a red halo around the pending speakers image. In a chairperson controlled forum, the chairperson can then allow a pending speaker to speak or leave him/her on the pending queue.

Figure 18:
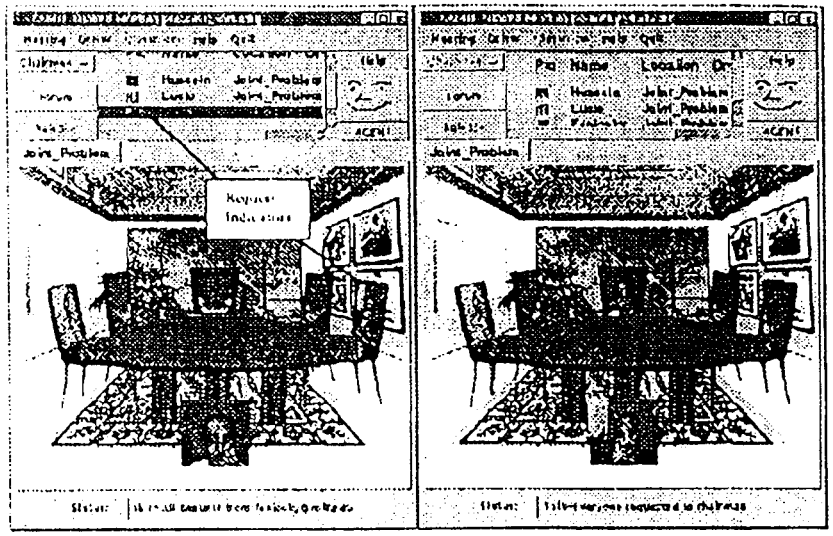
FIG. 18 is an image representing a speaking request as seen by a meeting chairman.

FIG. 18 shows the chairperson, Karim, accepting the speech request from Feniosky.

Figure 19:
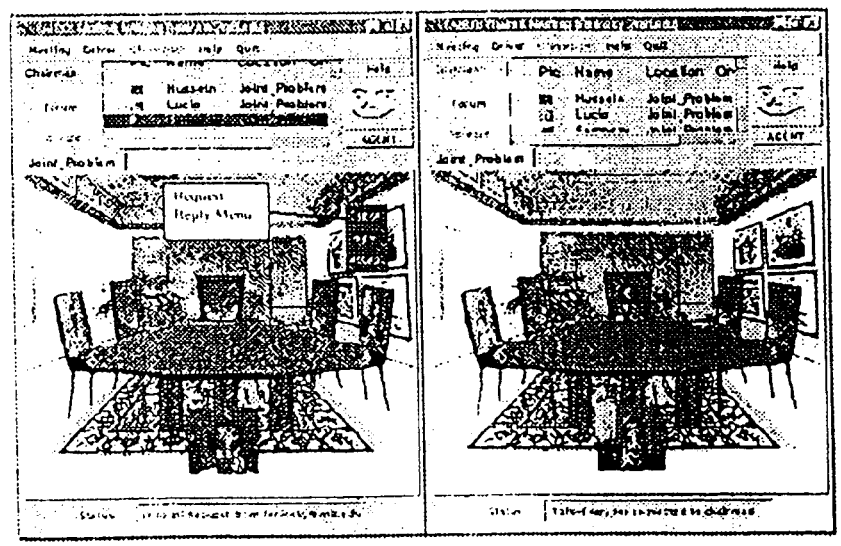
FIG. 19 is an image representing a chairman granting a request to speak.
Figure 19A:
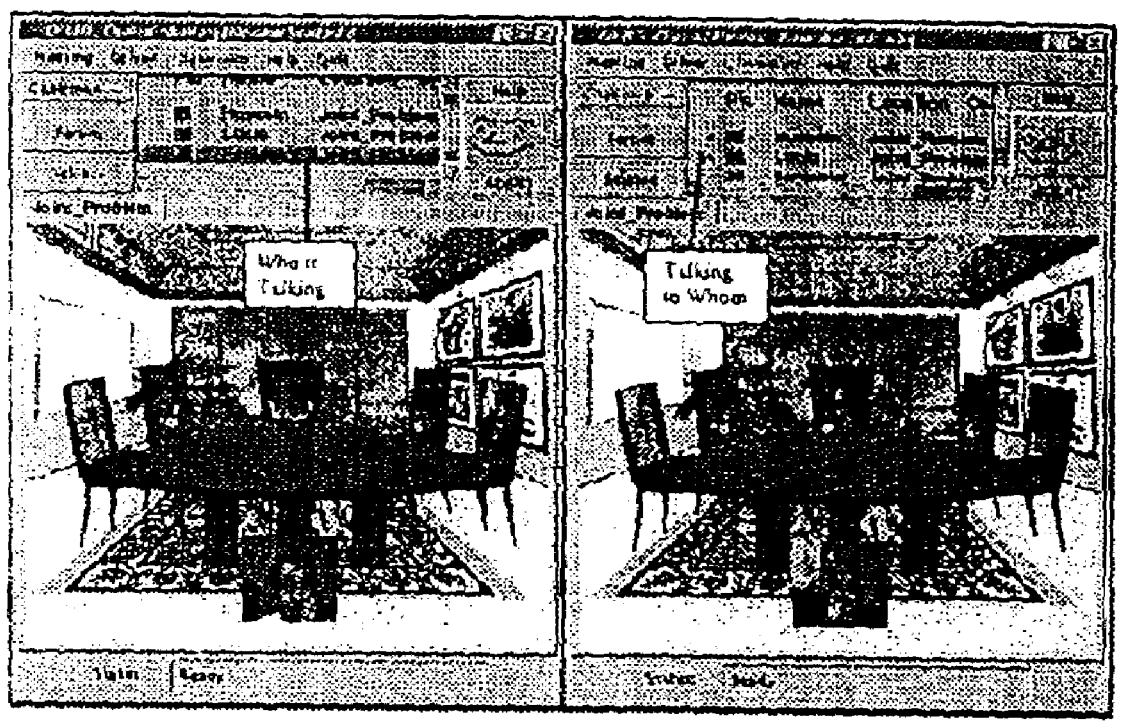
FIG. 19A is an image representing who is talking.

FIG. 19 shows the chairperson, Karim, granting the speech request from Feniosky. Finally, Feniosky gains the floor and is able to address the group as shown in FIG. 19A. The group members can determine the source of speaking by a green highlighting of the speakers name and a green halo around his/her image as shown on the left side of FIG. 19A. The speaker can determine his/her audience by bullet points that are displayed next to those that are listening to him/her as shown on the right side of FIG. 19A.

Tool and Artifact Manipulation is accomplished by several tools which are available for interaction and they can be accessed from the menu system or by clicking on their appropriate icon in the room (e.g., clicking on the whiteboard will bring up a shared drawing tool). As users interact with objects in the different tools the owner of a particular object is highlighted. The interface with a variety of tools is shown in FIG. 14.

Focus of Attention is supported by highlighting the currently active interaction tool. Furthermore, the current person speaking is also highlighted in the control console of the conferencing system 30 as shown in FIG. 19A. In the case where a tool is started by another individual in the conference, the tool will automatically be started on each distributed client to whom that individual is speaking. This creates an implicit focus of attention. More intrusive attention mechanisms were attempted (such as moving the focal window to the center of the screen), however, it was discovered that users resisted the loss of control over their environment that these automatic actions caused.

To show degree of engagement, either a spring metaphor, a heat metaphor or a shadow metaphor can be used. The Spring Metaphor reflects the tension and dynamism of the participants as they attempt to control the floor. The springs are attached to a central object on the table which acts as the focus of attention for the interaction. As a participant becomes increasingly engaged the springs tense up thereby indicating to the whole group the degree to which the participant is interested in addressing the group. Active speakers can be represented through color (e.g. active coils could be red) or they can be represented by the full stretch of the spring (i.e. the spring becomes a straight wire). The Heat Metaphor utilizes color to show degree of engagement of a participant in a conference. The Shadow Metaphor represents engagement as a shadow that emanates from each participant and shows their presence at the conference table. The metaphor has important benefits in that it portrays a sense of physical presence.

Before proceeding with a discussion of FIGS. 20–24, certain terminology is explained. The conferencing system of the present invention may be implemented using "object-oriented" computer programming techniques. Object-oriented computer programming techniques involve the definition, creation, use and destruction of software entities referred to as "objects." Each object is an independent software entity comprised of data generally referred to as "attributes" and software routines generally referred to as "member functions" or "methods" which manipulate the data.

One characteristic of an object is that only methods of that object can change the data contained in the object. The term "encapsulation" describes the concept of packaging the data and methods together in an object. Objects are thus said to encapsulate or hide the data and methods included as part of the object. Encapsulation protects an object's data from arbitrary and unintended use by other objects and therefore prevents an object's data from corruption.

To write an object-oriented computer program, a computer programmer conceives and writes computer code which defines a set of "object classes" or more simply "classes." Each of these classes serves as a template which defines a data structure for holding the attributes and program instructions which perform the method of an object. Each class also includes a means for instantiating or creating an object from the class template. The means for creating is a method referred to as a "constructor." Similarly, each class also includes a means for destroying an object once it has been instantiated. The means for destroying is a method referred to as a "destructor."

An abstract object class refers to any incomplete class that cannot therefore be used to instantiate semantically meaningful objects. An abstract class is used as a base class to provide common features, provide a minimum protocol for polymorphic substitution or declare missing common features that its derived class must supply prior to instantiation of an object.

When a processor of a computer executes an object-oriented computer program, the processor generates objects from the class information using the constructor methods. During program execution, one object is constructed, which object may then construct other objects which may, in turn, construct other objects. Thus, a collection of objects which are constructed from one or more classes form the executing computer program.

Inheritance refers to a characteristic of object oriented programming techniques which allows software developers to re-use pre-existing computer code for classes. The inheritance characteristic allows software developers to avoid writing computer code from scratch. Rather, through inheritance, software developers can derive so-called subclasses from a base class. The subclasses inherit behaviors from base classes. The software developer can then customize the data attributes and methods of the subclasses to meet particular needs.

With a base-class/sub-class relationship, a first method having a particular name may be implemented in the base-class and a second different method with the same name may be implemented differently in the sub-class. When the program is executing, the first or second method may be called by means of a statement having a parameter which represents an object. The particular method which is called depends upon whether the object was created from the class or the sub-class. This concept is referred to as polymorphism.

For example, assume a computer program includes a class called Employee. Further assume that class Employee includes a member function which defines a series of method steps to be carried out when a worker retires from the company. In an object-oriented implementation, the retire method is automatically inherited by sub-classes of class Employee. Thus, if a class called Executive is a sub-class of the class called Employee, then class Executive automatically inherits the retire method which is a member function of the class Employee.

A company or organization, however, may have different methods for retiring an employee who is an executive and an employee who is not an executive. In this case, the sub-class Executive could include its own retire method which is performed when retiring an employee who is an executive. In this situation, the method for retiring executive employees contained in the Executive class overrides the method for retiring employees in general contained in the Employee class. With this base class/sub-class arrangement another object may include a method which invokes a retirement method. The actual retirement method which is invoked depends upon the object type used in the latter call. If an Executive object type is used in the call, the overriding retirement method is used. Otherwise, the retirement method in the base-class is used. The example is polymorphic because the retire operation has a different method of implementation depending upon whether the object used in the call is created from the Employee class or the Executive class and this is not determined until the program runs.

Since the implementation and manner in which data attributes and member functions within an object are hidden, a method call can be made without knowing which particular method should be invoked. Polymorphism thus extends the concept of encapsulation.

Object-oriented computer programming techniques allow computer programs to be constructed of objects that have a specified behavior. Several different objects can be combined in a particular manner to construct a computer program which performs a particular function or provides a particular result. Each of the objects can be built out of other objects that, in turn, can be built out of other objects. This resembles complex machinery being built out of assemblies, subassemblies and so on.

For example, a circuit designer would not design and fabricate a video cassette recorder (VCR) transistor by transistor. Rather, the circuit designer would use circuit components such as amplifiers, active filters and the like, each of which may contain hundreds or thousands of transistors. Each circuit component can be analogized to an object which performs a specific operation. Each circuit component has specific structural and functional characteristics and communicates with other circuit components in a particular manner. The circuit designer uses a bill of materials which lists each of the different types of circuit components which must be assembled to provide the VCR. Similarly, computer programs can be assembled from different types of objects each having specific structural and functional characteristics.

The term "client object," or more simply "client," refers to any object that uses the resources of another object which is typically referred to as the "server object" or "server." The term "framework" can refer to a collection of inter-related classes that can provide a set of services (e.g., services for network communication) for a particular type of application program. Alternatively, a framework can refer to a set of interrelated classes that provide a set of services for a wide variety of application programs (e.g., foundation class libraries for providing a graphical user interface for a Windows system). A framework thus provides a plurality of individual classes and mechanisms which clients can use or adapt.

An application framework refers to a set of classes which are typically compiled, linked and loaded with one particular application program and which are used by the particular application program to implement certain functions in the particular application program. A system framework, on the other hand, is provided as part of a computer operating system program. Thus, a system framework is not compiled, linked and loaded with one particular application program. Rather, a system framework provides a set of classes which are available to every application program being executed by the computer system which interacts with the computer operating system.

Also it should be appreciated that FIGS. 20–24 are a series of object class diagrams illustrating the relationships between components (here represented as object classes) of the conferencing system. The rectangular elements (typified by element 22), herein denoted as "object icons," represent object classes having a name 222a, attributes 222b and member functions 222c.

The object diagrams do not depict syntax of any particular programming language. Rather, the object diagrams illustrates the functional information one of ordinary skill in the art requires to generate computer software to perform the processing required of a conferencing system such as conferencing system 30 (FIG. 3). It should be noted that many routine program elements, such as constructor and destructor member functions are not shown.

Figure 20:
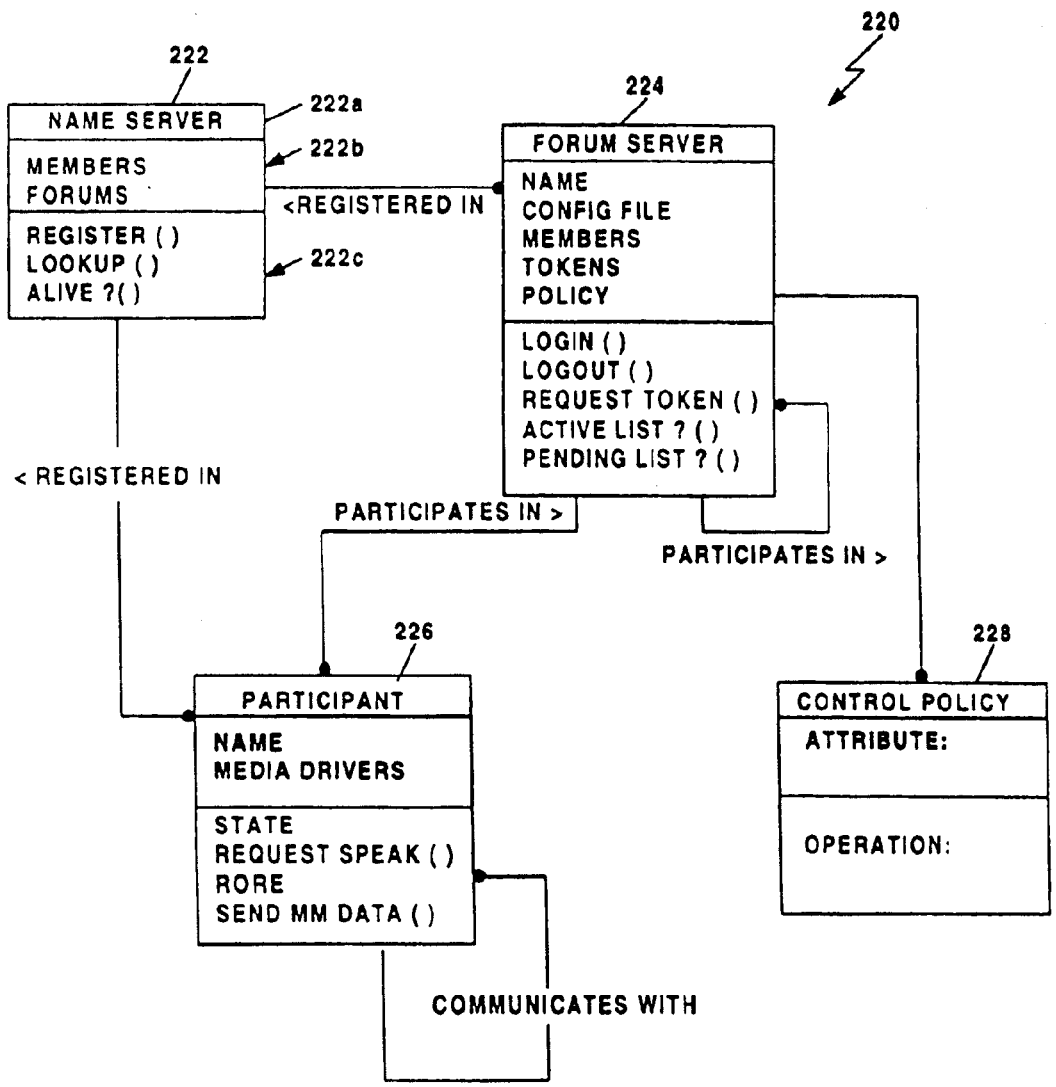
FIG. 20 is an object diagram showing server interconnectivity.

Turning now to FIG. 20, an object diagram illustrating the overall server connectivity includes a name server object class 222, a forum server object class 224, a participant class 226 and a control policy class 228.

Figure 21:
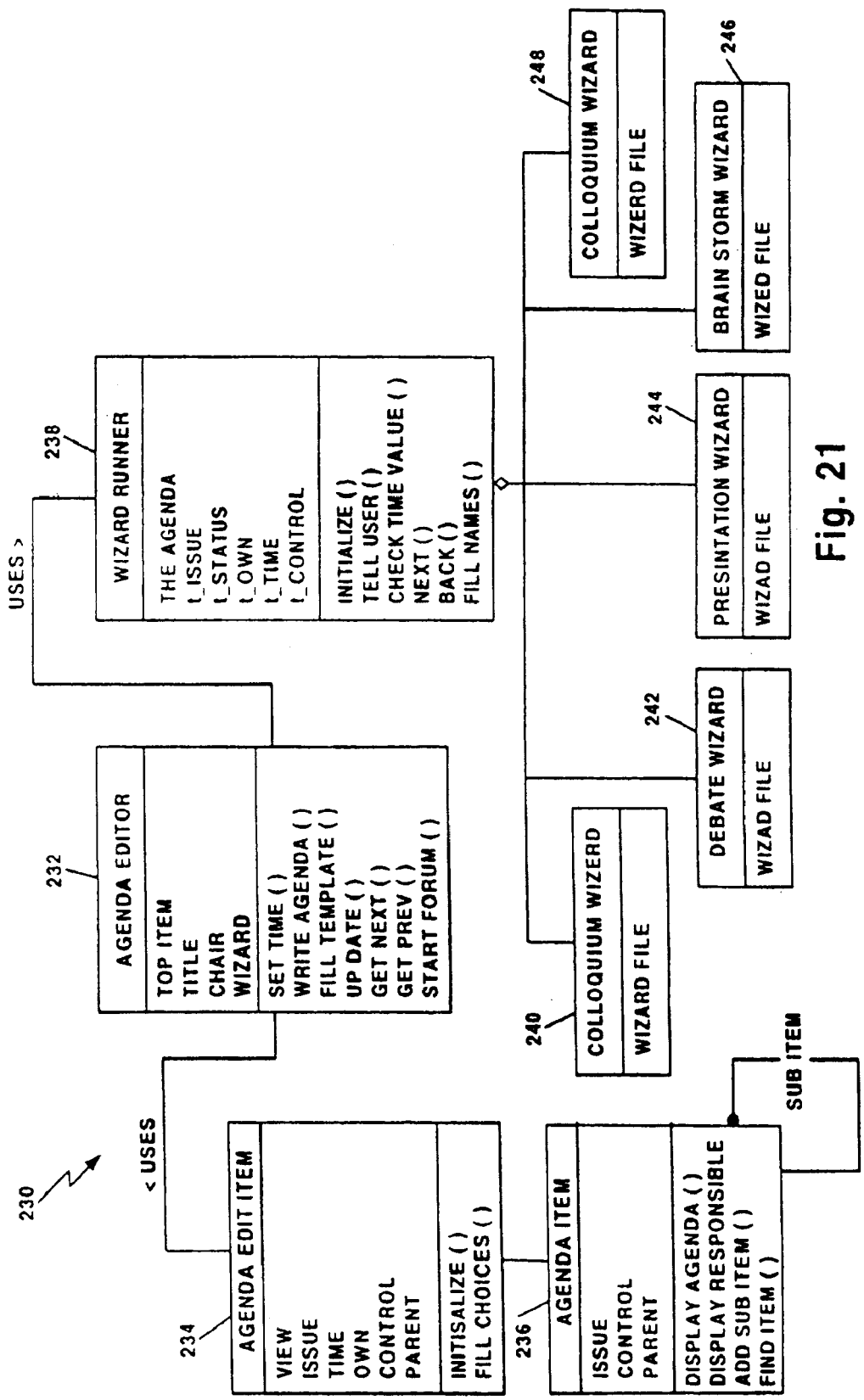
FIG. 21 is an object diagram of an Agenda Editor and Wizard classes.

Referring now FIG. 21, an object diagram illustrating an agenda editor and a wizard includes an agenda editor object class 232, an agendaedititem object class 234, and an agendaitem object class 236. The agendaeditor object class 232 also uses a wizardrunner object class 238, and a plurality of different wizard object classes 240–248.

Figure 22:
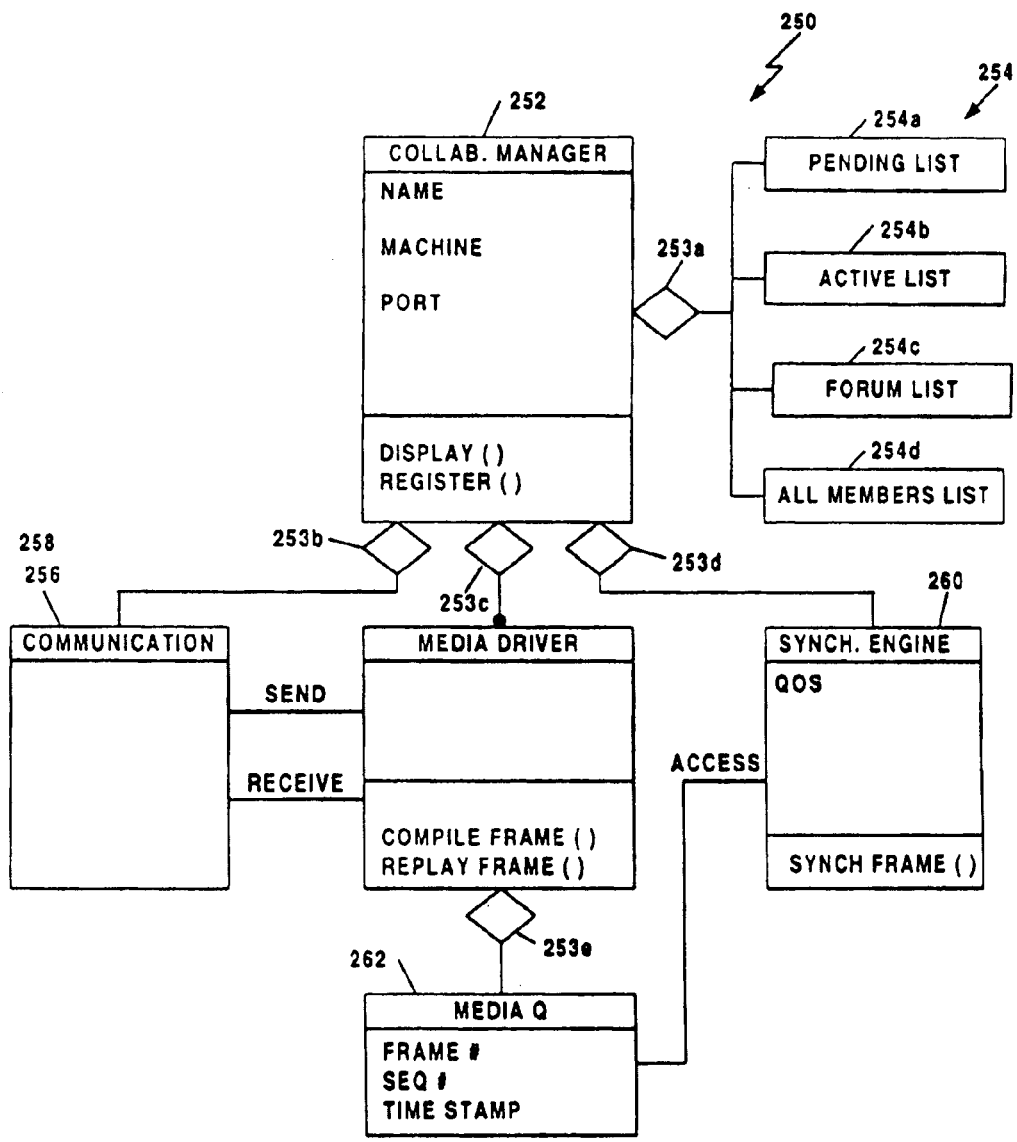
FIG. 22 is an object diagram of the structure of the participant in a conferencing system of the type described above in conjunction with FIG. 3.

Referring now FIG. 22, an object diagram 250 illustrating components of a conferencing system participant includes a collaboration manager 252 and a series of lists 254a–254d related to the collaboration manager object class 252 through a control condition 253a. Also related to the collaboration manager object class 252 through control conditions 253b–253d, respectively are a communication object class 256, a media driver object class 258 and a synchronization engine object class 260. Send and receive messages pass between objects instantiated from the Communication and Media Driver object classes 256, 258. Associated with the media driver object class 258 through a control 253e is a media Q object class 262. Access messages pass between objects instantiated from the media driver and media Q object classes 258, 260.

Figure 23:
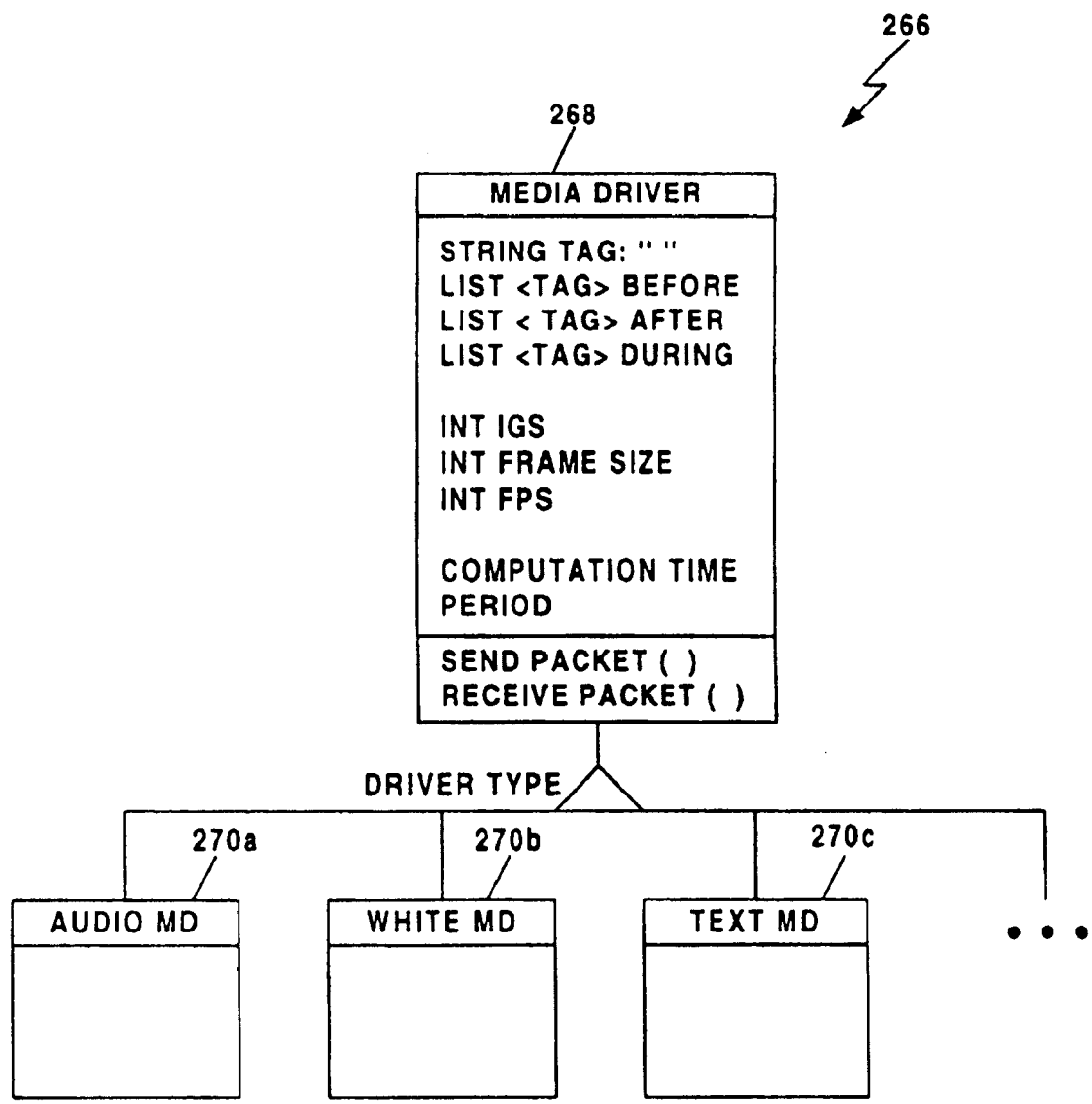
FIG. 23 is an object diagram of media driver classes.

Referring now FIG. 23, an object diagram 266 illustrating components of the media driver object classes includes a media driver object class 268 having associated therewith an audio media driver object class (Audio MD) 270a, a white board media driver object class (White MD) 270b and a text media driver object class (Text MD) 270c. Other media drivers could also be associated with the Media Driver object class 268.

Figure 24:
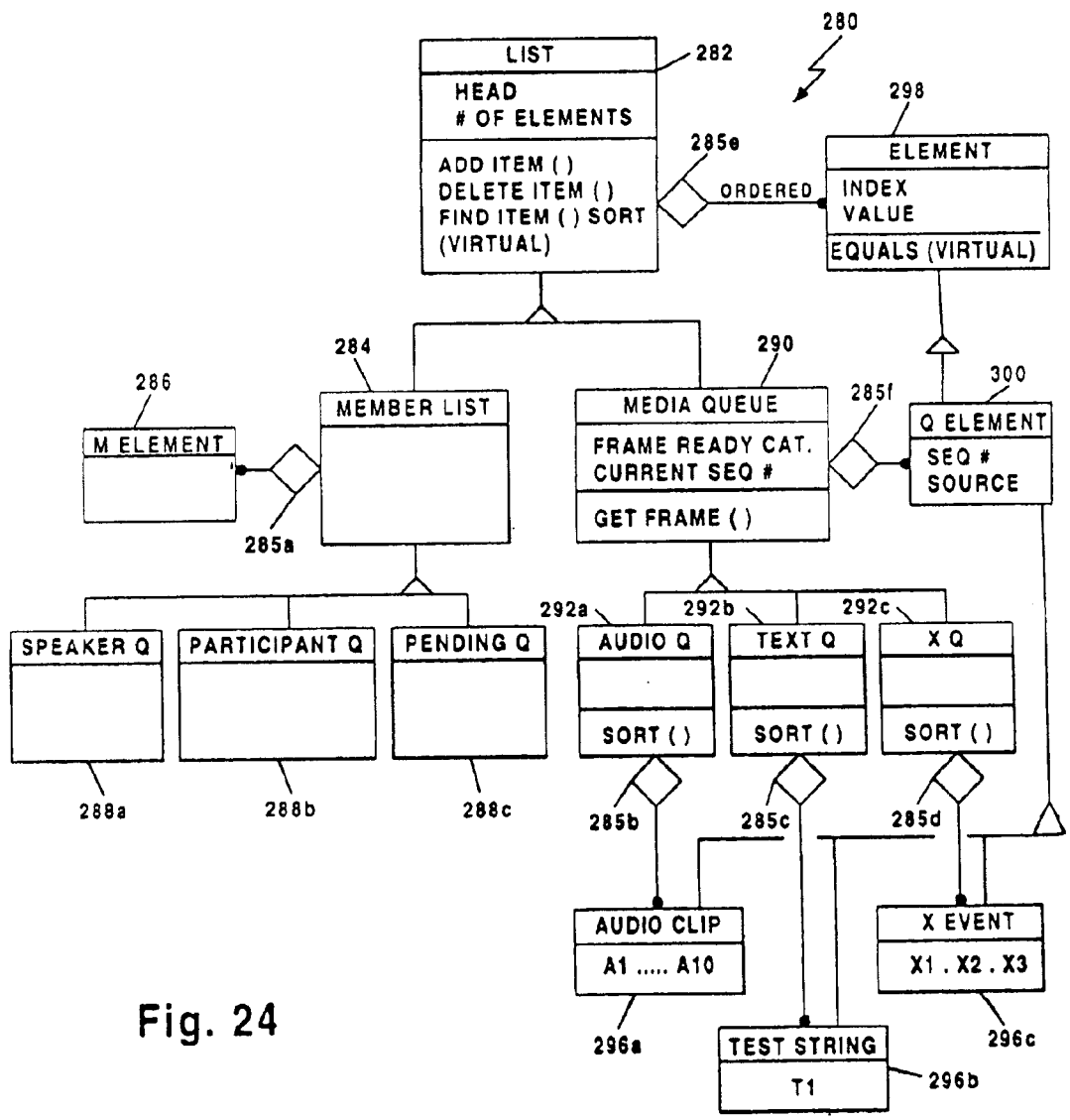
FIG. 24 is an object diagram showing a queue structure hierarchy.

Referring now FIG. 24, an object diagram 280 illustrating components of a queue structure hierarchy which includes a list object class 282. Associated with the list object class 282 are a member list object class 284 and a media queue object class 290. An M element object class 286 is associated the member list 284 through a control 285a.

A speaker Q, Participant Q and a pending Q 288a–288c are all associated with the member list class 284. Similarly an Audio Q, Text Q and X Q classes 292a–292c are associated with the Media Queue class. Audio clip, text string and X event classes 296a–296c each have a respective control 285c–285d to the classes 292a–292c. An element class 298 is coupled to the list class 282 through a control 285e and a Q element class 300 is coupled to the media queue class 290 through a control 285f The Audio clip, text string and X event classes 296a–296c are each associated with the Q element class 300.

The message protocols for the system of the present invention are shown below in Tables 1–6.

TABLE 1

Message Protocol for Forum Server Output Messages

| Prefix | ARG1 | ARG2 | ARG3 | ARG4 | Comment |
|--------|------|------|------|------|---------|
| RF | Name | Machine | Port | | Sends a forum registration message to the Name Server. |
| DF | Name | Machine | Port | | Sends a forum removal message to the Name Server. |
| AK | Name | Machine | Port | | Acknowledge a user login. |
| RE | Name | Machine | Port | | Reference Refuses a user login and Sends a reference e-mail address to request membership in the forum. |
| UA | User # | Total # | Name | Machine, Port | Sends a list of all active users. |
| UR | User # | Total # | Name | Machine, Port | Sends a list of all pending speakers. |
| K | From | To | Expiry | Type | Provides a conversation token to a user. |
| L | From | To | Type | | Force a retrieve of a token from a System user. |

TABLE 2

Message Protocol for Forum Server Input Messages

| Prefix | ARG1 | ARG2 | ARG3 | Comment |
|---|---|---|---|---|
| A | User Name | Machine | Port | Registers a user with the forum |
| D | User Name | | | Removes a user from the forum |
| R | From Name | To Name | Token Type | Request a Speech Token from the Forum. Enforces a collaboration control |
| N | From Name | | | Releases a speech token from the Forum so that it can be re-used |

TABLE 3

Name Server Output Messages

| Prefix | ARG1 | ARG2 | ARG3 | ARG4 | Comment |
|---|---|---|---|---|---|
| FF | Name | Machine | Port | | Sends a forum's complete directory information in response to a collaboration system user |
| FU | Name | Machine | Port | | Sends a forum's complete directory information in response to a collaboration system user request |
| GU | User # | Total # | Name | Machine, Port | Returns list of system users |
| GF | Forum # | Total # | Name | Machine, Port | Returns list of active system users |

TABLE 4

Name Server Input Messages

| Prefix | ARG1 | ARG2 | ARG3 | Comment |
|---|---|---|---|---|
| RU | User Name | Machine | Port | Registers a user with the nameserver |
| RF | Forum Name | Machine | Port | Registers a forum with the nameserver |
| DU | User Name | Machine | Port | Removes a user from the nameserver |
| DF | Forum Name | Machine | Port | Removes a forum from the nameserver |
| LU | User Name | | | Logs in a Registered user with the nameserver, the user is now actively using the collaboration system |
| LF | Forum Name | | | Logs in a Registered forum with the nameserver, the Forum is now actively using the collaboration system |
| OU | User Name | | | Logs out a Registered user with the nameserver, the user is no longer actively using the collaboration system |

TABLE 4-continued

Name Server Input Messages

| Prefix | ARG1 | ARG2 | ARG3 | Comment |
|---|---|---|---|---|
| OF | Forum Name | | | Logs out a Registered forum with the nameserver the Forum is no longer actively using the collaboration system |
| GU | | Machine | | Port | Request list of all active users from the nameserver |
| GF | | Machine | Machine | Port | Request list of all active Forums from the nameserver |
| FU | Search Name | Machine | Port | Request machine and port number of the user Search Name from the Nameserver |
| FF | Search Name | Machine | Port | Request machine and port number of the forum Search Name from the nameserver |
| HU | UserName | | | Ping Reply from a user |
| HF | ForumName | | | Ping reply from a forum server |

TABLE 5

Collaboration Manager Output Messages

| Prefix | ARG1 | ARG2 | ARG3 | Comment |
|---|---|---|---|---|
| M? | Frame # | SEQ# | Data | Transmits messages to another participant's media drivers Where ? = T, D, A and T = Text Media Driver D = Whiteboard Media Driver and A = Audio Media Driver |
| RU | User Name | Machine | Port | Registers a user with the nameserver |
| DU | User Name | Machine | Port | Removes a user from the nameserver |
| LU | User Name | | | Logs in a Registered user with the nameserver, the user is now actively using the collaboration system |
| OU | User Name | | | Logs out a Registered user with the nameserver, the user is no longer actively using the collaboration system |
| GU | | Machine | | Port | Request list of all active users from the nameserver |
| GF | | Machine | Machine | Port | Request list of all active Forums from the nameserver |
| FU | Search Name | Machine | Port | Request machine and port number of the user Search Name from the Nameserver |
| FF | Search Name | Machine | Port | Request machine and port number of the forum Search Name from the nameserver |
| A | User Name | Machine | Port | Registers a user with the forum |
| D | User Name | | | Removes a user from the forum |
| R | From Name | To Name | Token Type | Request a Speech Token from the Forum. Enforces a collaboration control |
| N | From Name | | | Releases a speech token from the Forum so that it can be re-used |

TABLE 6

Collaboration Manager Input Messages

| Prefix | ARG1 | ARG2 | ARG3 | ARG4 | Comment |
|---|---|---|---|---|---|
| q | | | | | move to the next step in the Demonstration script |
| M? | Frame # | SEQ# | Data | | Receives messages from another participant's media drivers where: ? = T, D, A; T = Text Media Driver; D = Whiteboard Media Driver; and A = Audio Media Driver |
| FF | Name | Machine | Port | | Sends a forum's complete directory information in response to a Find User request to the name server |
| FU | Name | Machine | Port | | Receives a user's complete directory information in response to a Find User request to the name server |
| GU | User # | Total # | Name | Machine, Port | Receives a list of system users |
| GF | Forum # | Total # | Name | Machine, Port | Returns list of forums which are Registered with the name server |
| UA | User # | Total # | Name | Machine, Port | Receives a list of all active users. |
| UR | User # | Total # | Name | Machine, Port | Receives a list of all pending speakers |
| AK | Name | Machine | Port | | Acknowledge a user login. |
| Re | Name | Machine | Port | Reference | Refuses a user login and sends a reference e-mail address to request membership in the forum |
| K | From | To | Expiry | Type | A token is received that allows conversation between the users and the person specified by To. |
| L | From | To | Type | | Forces the collaboration manager to remover the conversation token associated with the (From, To) conversation |

Figure 25:
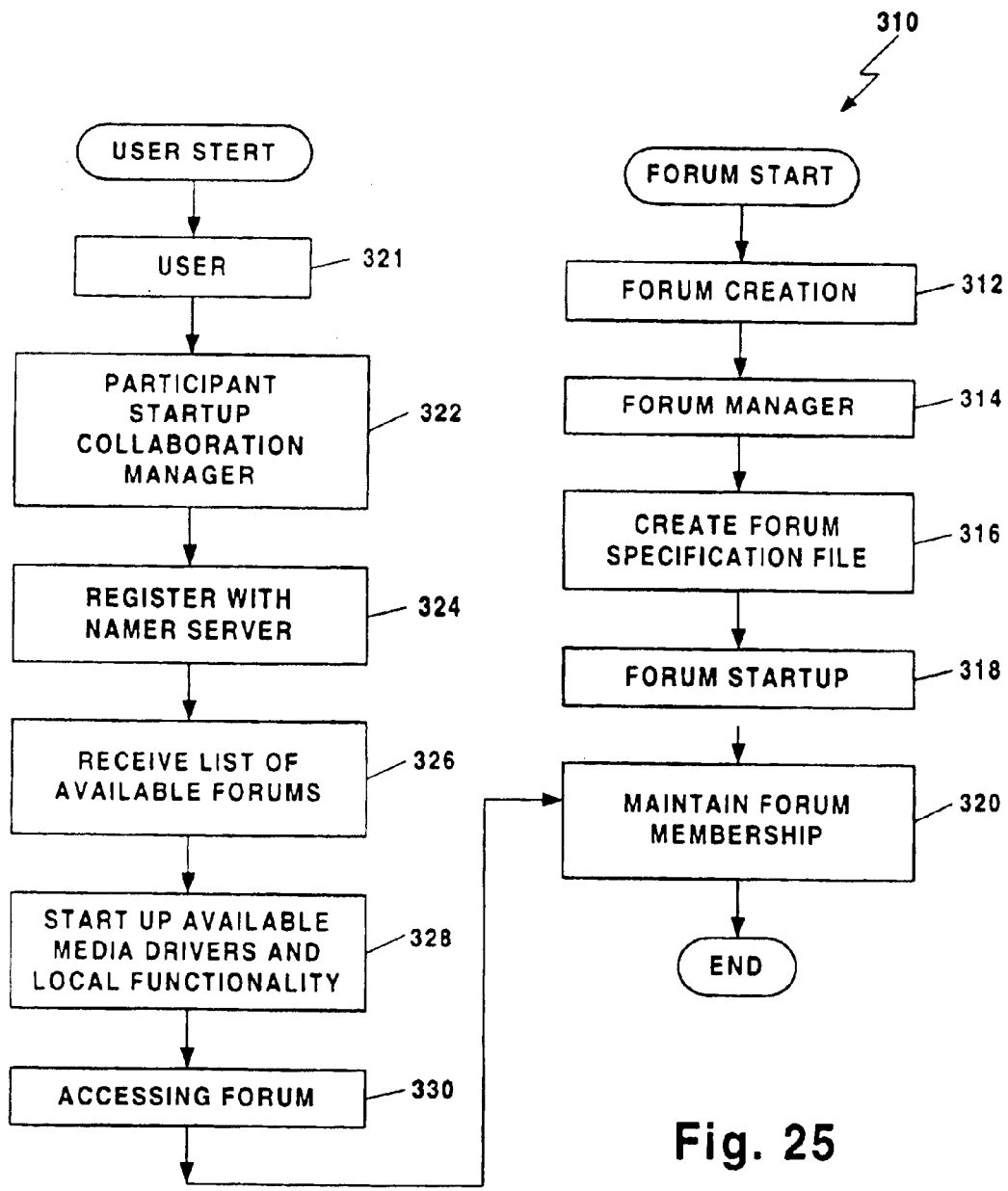
FIG. 25 is a flow diagram for the forum process.
Figure 26:
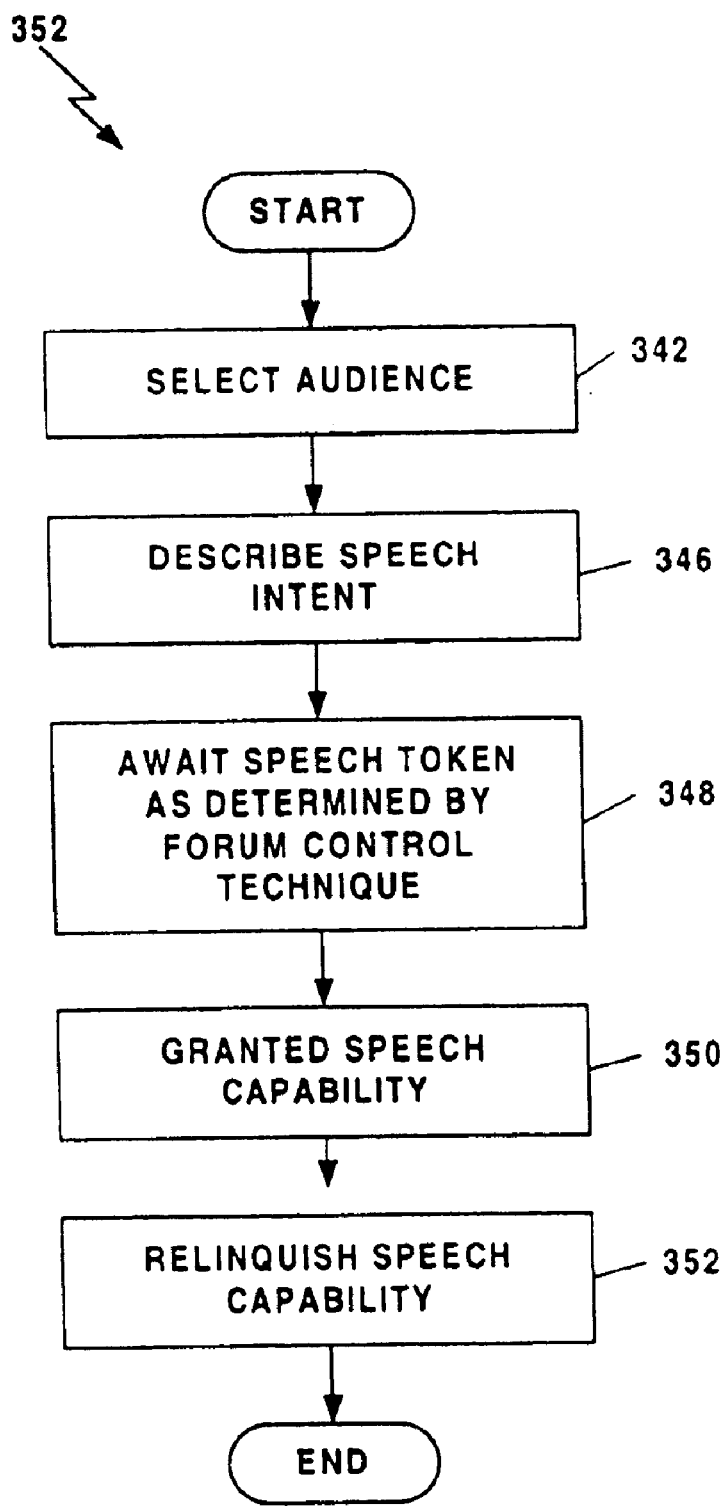
FIG. 26 is a flow diagram for a speaking request.

Referring now to FIG. 25, a flow diagram for the forum process 310 is shown for the conferencing system 30. A Forum Creation routine 312 is performed to create a new forum. As described earlier, a forum is a virtual presentation of a meeting room (e.g. meeting rooms 90–94 in FIGS. 7, 7A and 7B) where clients can collocate over the internet under certain constraints. Next, a Forum Manager routine 314 is performed to initiate the forum manager. Forum processes are initiated by the forum manager routine that allows the definition of meeting membership, meeting control strategies, meeting agenda and meeting notification. From the later, a Create Forum Specification File process 316 is performed. During this process a forum specification file is created and a typical file follows:

Forum File Format

Line 0: <FORUM NAME> [Name of Forum]
Line 1: [Number of Members]
Line 2:
Line 3: <NAME> [Name of Member1]
Line 4: <MACHINE> [Member1 Machine]
Line 5: <PORT> [Member1 Port]
Line 6: <NUM DRIVER> [Number of Drivers Supported]
Line 7: <DRIVER NAME> [Name of Driver1]
Line 8: <DRIVER NAME> [Name of Driver2]
.
.
.
Line M + 1: <MEMBER TYPE> [Type of Member1]
Line M + 2:
Line M + 3: <NAME> [Name of Member2]
Line M + 4: <MACHINE> [Member2 Machine]
Line M + 5: <PORT> [Member1 Port]
Line M + 6: <NUM DRIVER> [Number of Drivers Supported]
193
Line M + 7: <DRIVER NAME> [Name of Driver1]
Line M + 8: <DRIVER NAME> [Name of Driver2]
.
.
.
Line N: <FORUM TYPE> [Type of Forum]
Line N + 1: <CHAIRMAN> [Name of Chairman]
Line N + 3: <SPEECH DURATION> [Max. Speech Duration]
Line N + 4: <INTER DURATION> [Max. Interjection Duration]
Line N + 5: <NUM SPEAKER> [Max Number of Simultaneous Speakers]
Line N + 6: <SIDE CONVERSE> [Side Conversations Allowed?]
Line N + 7: <EXT CONVERSE> [External Conversations Allowed?]
Line N + 8: <LOG MODE> [Logging Mode]
Line N + 9: <LOG FILE> [Name of Forum Log File]
Line N + 10:
Line N + 11: Any additional parameters to be specified for a Forum . . .

Next, a Forum Startup process 318 is performed followed by a Maintain Forum Membership process 320. The forum process routine 310 are processes that maintain control of a conference among several individuals and enforces membership constraints. Furthermore the forum process routine 310 logs all conference proceedings. The forum manager defines a specific control methodology. The Forum manager also provides mechanisms for converting a forum server's control strategy. Furthermore, a name process (not shown) maintains a directory of all participants, forum managers and forum servers within the conferencing system 30. The name process allows each participant to easily address any other member or forum in the conferencing system 30.

At a user workstation (not shown) where a participant resides, a Participant Startup Collaboration Manager process 322 is performed to startup the client process. A Register with Name Server process 324 is performed to announce that the user is on-line. A Receive Lists of Available Forums process 326 is performed to obtain from the name server a list of available forums. Next a Startup Available Media Drivers and Local Functionality process 328 is performed to make available to the user the different tools and media devices existing at the workstation. An Accessing Forum process 330 is performed where the workstation will attempt to join a particular forum. If the participant is on the membership list of that particular forum, then the participant is allowed to join the forum in session.

Figure 27:
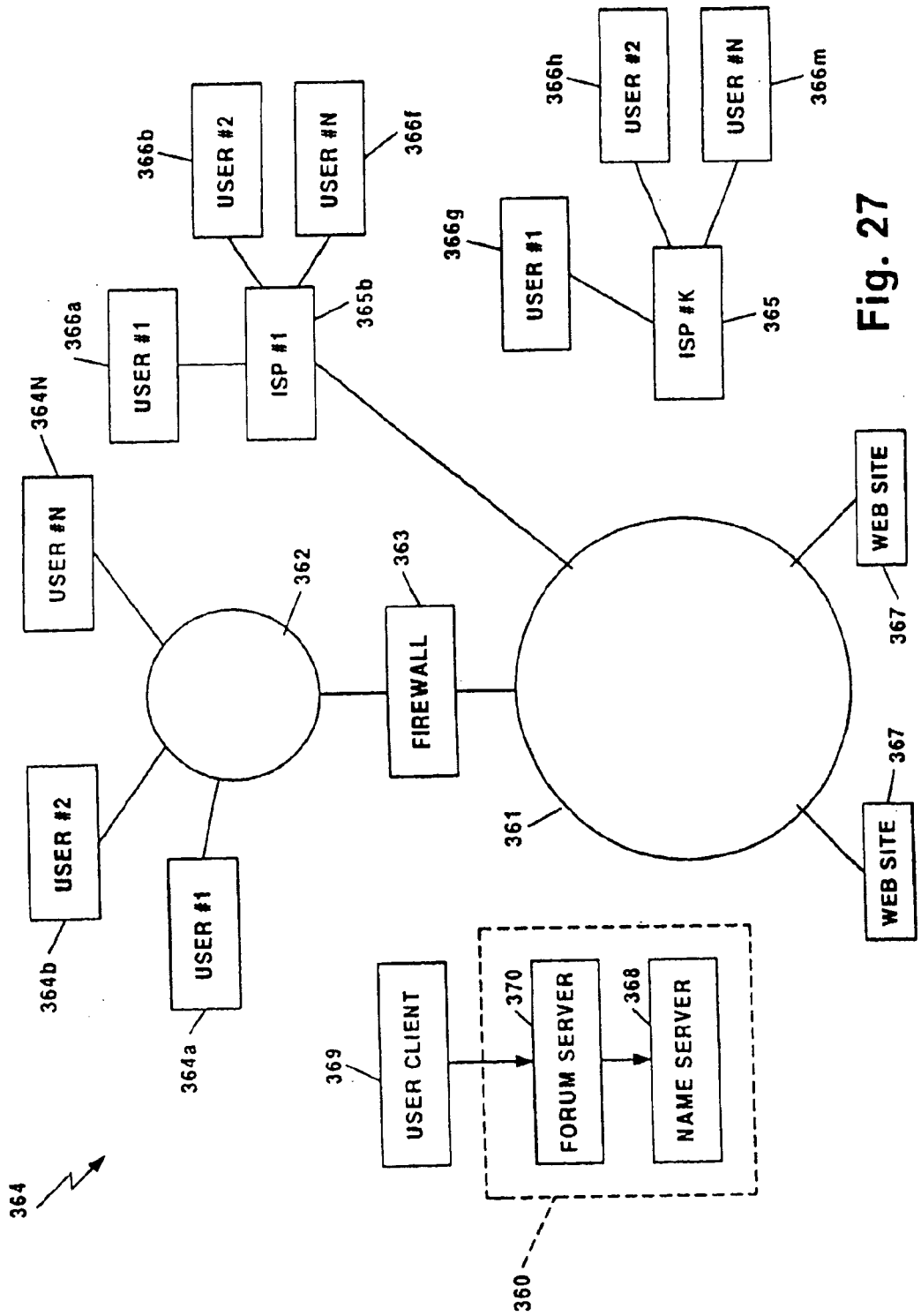
FIG. 27 is a block diagram of a conferencing system operative over a computer network.

Referring now to FIG. 27, a Request to Speak process 340 is shown. If a participant wishes to speak, a Select Audience process 342 is performed where the participant selects the target audience to speak with. If the participant wishes to speak to the entire audience, a select all is chosen, else the participant can select certain members of the meeting to have a side conservation. Next a Describe Speech Intent process 346 is performed where the participant describes the content of the intended speech. An Await Speech Token as Determined by Forum Control Technique process 348 is then performed. The participant is placed in a pending queue and depending on the control technique is put in the speaking queue. The Request to Speak is equivalent to a professional raising his/her hand in a meeting situation. It indicates to the forum moderator and to the other members of the forum the participant's intent to speak. A speaker request is accompanied by a qualification of the speech act the speaker intends to perform. The forum server would then place the participant on a list of pending speakers depending on his/her qualifications. In a democratic forum a participant becomes active if a majority agrees to his/her request to speak. Furthermore, the computer can automatically moderate (i.e. choose the active speakers from the pending queue) a forum based on pre-compiled speaker qualification data. Interjection is a mode of conversation in which the participant can interrupt an ongoing conversation for a limited amount of time. Depending upon which control technique is invoked, a Granted speech Capability process 350 is performed and the speech token is passed to the participant. The participant continues to speak until done and then a Relinquish Speech Capability process 352 is performed and the speech token is passed to the next speaker as controlled by the control technique.

Figure 28:
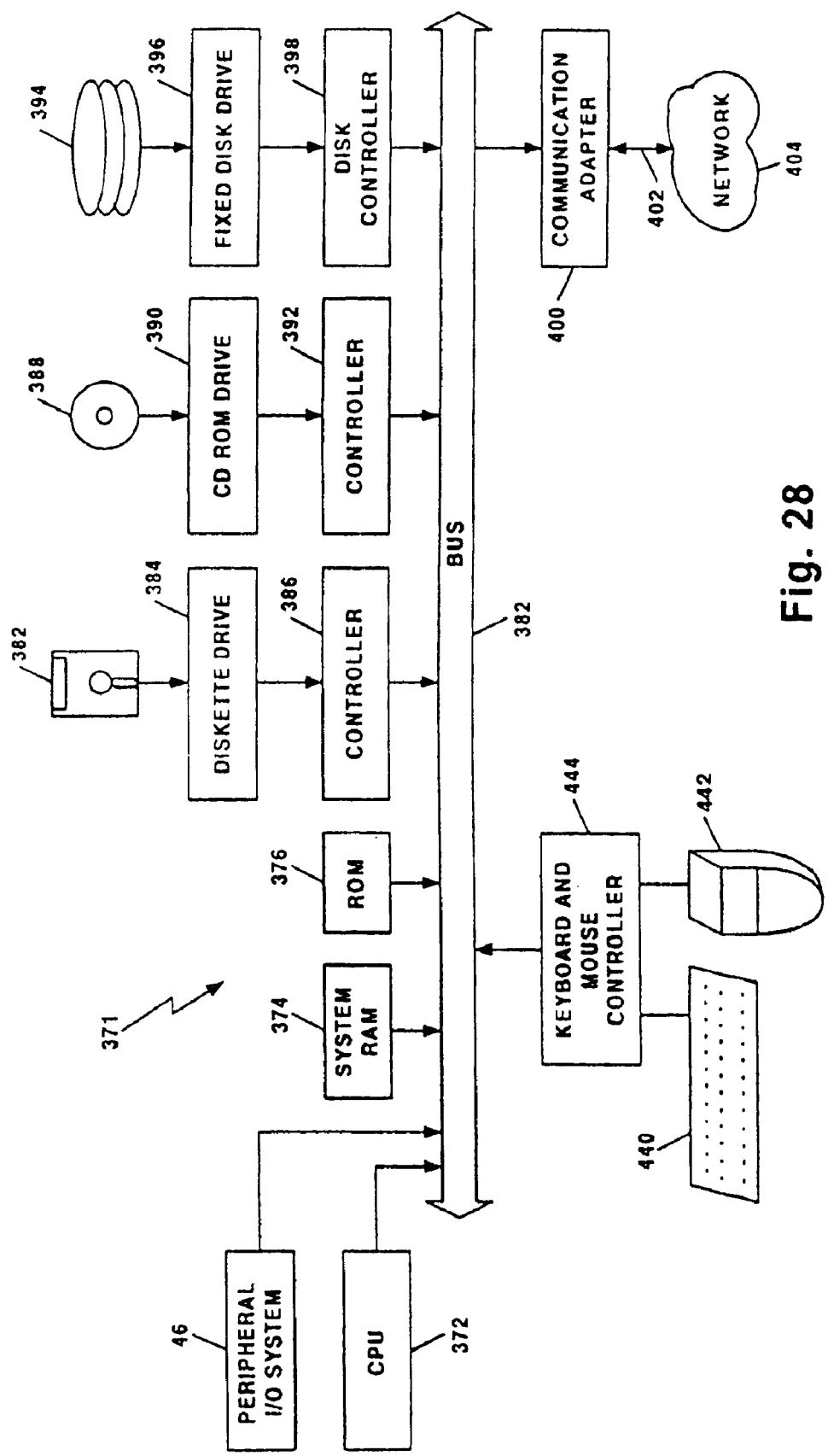
FIG. 28 is a block diagram of an illustrative computer system on which may be executed computer code to allow participants to use a collaborative system.

Referring now to FIG. 28, a conferencing system 360 is coupled to a public network or internet 361. As used herein, the term "internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services. The system and techniques described herein can be used on any internet including the so-called Internet.

In some embodiments the conferencing system 360 may be coupled to the internet 361 through a private network or intranet 362 and/or through a fire wall server 363. As shown in FIG. 27, coupled to the private network 362 are a plurality of users 364a–364N generally denoted 364.

As described herein, the exemplary public network of FIG. 28 is for descriptive purposes only. Although the description may refer to terms commonly used in describing particular public networks such as the Internet, the description and concepts equally apply to other public and private computer networks, including systems having architectures dissimilar to that shown in FIG. 28.

One of the unique aspects of the Internet system is that messages and data are transmitted through the use of data packets referred to as "data grams." In a data gram based network, messages are sent from a source to a destination in a manner similar to a government mail system. For example, a source computer may send a data gram packet to a destination computer regardless of whether or not the destination computer is currently powered on and coupled to the network. The Internet protocol (IP) is completely sessionless, such that IP data gram packets are not associated with one another.

The fire wall server 363 is a computer which couples the computers of a private network e.g. network 362 to the internet 361. Firewall Server 363 may thus act as a gatekeeper for messages and data grams going to and from the internet 361.

An Internet service provider (ISP) 365 is also coupled to the internet 361. A service provider is a person or organization that provides connections to a part of the internet. Internet service provider 365 utilizes a processing device to couple a plurality of users 366a–366m to the Internet 361. Thus, users 366a–366m are coupled to the internet through internet service provider 365. Also coupled to the internet 361 are a plurality of web sites or nodes 367. When a user wishes to conduct a transaction at one of the nodes 367, the user accesses the node 367 through the Internet 361.

Each node in the fire wall shown in FIG. 28 is configured to understand which fire wall and node to send data packets to given a destination IP address. This may be implemented by providing the fire walls and nodes with a map of all valid IP addresses disposed on its particular private network or another location on the Internet. The map may be in the form of prefix matches up to and including the full IP address.

The conferencing system 360 includes a name server 368 and a forum server 370. When a participant wishes to use the conferencing system 360a the user/participant starts user/client process 369 which interacts with the forum and name servers 370, 368 in a manner described hereinabove. Information related to forums and participants can be stored in the name and forum servers 368, 370.

Conferencing system 370 may be provided, for example, as an object-oriented database management system (DBMS), a relational database management system (e.g. DB2, SQL, etc.) or any other type of database package. Thus, the database 369 and the system 370 can be implemented using object-oriented technology or via text files.

It should be appreciated that the users 364a-364N and 366a–366m each can participate in a conference hosted by conferencing system 360.

Referring now to FIG. 29, a computer system 371 on which the collaborative training and distance learning system of the present invention may be implemented is shown. Computer system 371 may be provided, for example, as an IBM compatible computer or an equivalent computer system. The exemplary computer system 371 of FIG. 29 is for descriptive purposes only. Although the description may refer to terms commonly used in describing particular computer systems, the description and concepts equally apply to other processing systems, including systems having architectures dissimilar to that shown in FIG. 29.

Computer system 371 includes a central processing unit (CPU) 372, which may be provided, for example, as a conventional microprocessor, a random access memory (RAM) 374 for temporary storage of information, and a read only memory (ROM) 376 for permanent storage of information. Each of the aforementioned components are coupled to a bus 380. Operation of computer system 371 is generally controlled and coordinated by operating system software. The operating system controls allocation of system resources and performs tasks such as processing, scheduling, memory management, networking, and I/O services, among other things. Thus, an operating system resident in system memory and executed by CPU 372 coordinates the operation of the other elements of computer system 371.

Also coupled to bus 382 is a non-volatile mass storage device which may be provided as a diskette 382. Diskette 382 is insertable into a diskette drive 384 which is, in turn, coupled to bus 380 by a controller 386. Similarly, a compact disc (CD) ROM 388 is insertable into a CD ROM drive 390 which is, in turn, coupled to bus 380 by a controller 392. A hard disk 394 is typically provided as part of a fixed disk drive 396 which is coupled to bus 280 by a disk controller 398.

Data and software may be provided to and extracted from computer system 271 via removable storage media such as hard disk 394, diskette 392, and CD ROM 388. For example, generated data values may be stored on storage media similar to media 382, 388, 394. The data values may then be retrieved from the media 282, 288, 394 by CPU 272 and utilized by CPU 272 to recommend one of a plurality of items in response to a user's query.

Alternatively, computer software useful for performing computations related to collaborative training and distance learning methods may be stored on storage media similar to media 282, 288, 394. Such computer software may be retrieved from media 282, 288, 394 for immediate execution by CPU 272 or by processors included in one or more peripherals such as communication adapter 400. CPU 272 may retrieve the computer software and subsequently store the software in RAM 274 or ROM 276 for later execution.

User input to computer system 271 may be provided by a number of devices. For example, a keyboard 440 and a mouse 442 are coupled to bus 280 by a controller 444.

Computer system 271 also includes a communications adaptor 400 which allows the system to be interconnected to a local area network (LAN) or a wide area network (WAN), schematically illustrated by bus 402 and network 404. Thus, data and computer program software can be transferred to and from computer system 271 via adapter 400, bus 280 and network 404.

All references cited herein are hereby incorporated herein by reference in their entirety.

Having described preferred embodiments of the invention, it will now become apparent to one of ordinary skill in the art that other embodiments incorporating their concepts may be used. For example, the technique of the present invention is not limited to use with an internet. It should be understood that the techniques described herein work with any network. It should be appreciated, of course that the details of the implementation with different devices would of course be different. It is felt therefore that these embodiments should not be limited to disclosed embodiments, but rather should be limited only by the spirit and scope of the appended claims.

Appendix A

The following is the class for the implementation of the Agent suggestions

```
package edu.mit.cairo.client;
import java.awt.*;
import java.applet.*;
import java.net.*;
import java.util.*;
public class AgentSuggest extends Panel {
    int gid=0;
    meeting _mymanager;
    .
    .
    .
```

-continued

Appendix A

```
Image sphinx;
ImagePanel ip;
public AgentSuggest(meeting tp,String thetext, int pro) {
    _mymanager=tp;
    mytext = thetext+"done";
    process = pro;
}
public void init() {
    Panel bottompanel = new Panel();
    Panel toppanel = new Panel();
    .
    .
    .
    setLayout(new BorderLayout());
    add("Center",ip);
    add("South",bottompanel);
}
public void play() {
    Vector lines = new Vector();
    StringTokenizer st = new StringTokenizer(mytext);
    String line = "";
    String temp;
    int i=0;
    try{
        Thread.sleep(3000);
    } catch (InterruptedException ignored) {}
    while(!(temp = st.nextToken().trim()).equals("done")) {
        String check = "";
        if(line.length() == 0)
            check = temp;
        else
            check = line+" "+temp;
        if(check.length()>30) {
            lines.addElement(line);
            line = temp;
        } else line = check;
    }
    lines.addElement(line);
    for(int j=0;j<lines.size();j++) {
        ip.addObject(new
MapLabel((String)lines.elementAt(j),.1166,.4365+(.1*j),new
Font("Helvetica", Font.BOLD, 10),ip));
        i=0;
        int step = (ip.getSize().width-20)/20;
        while(i < 20) {
            try{
                Thread.sleep(100);
            } catch(InterruptedException ignored) {}
            ip.repaint(10+(i*step),(int)((.4365+
(.1*j))*ip.getSize().height)-10,step,15);
            i++;
        }
    }
}
public boolean handleEvent(Event e) {
    if ((e.id == Event.ACTION_EVENT)&&
        (e.target instanceof Button)) {
        String butt = (String)e.arg;
        if (butt.equals("Accept")){
            _mymanager.setProcess(process);
            System.out.println("Agent Accepting with"+process);
            getParent().hide();
        }
        if (butt.equals("Reject")){
            System.out.println("Agent Rejecting");
            getParent().hide();
        }
    }
    switch (e.id) {
    case Event.WINDOW_DESTROY:
        System.exit(0);
        return true;
    default:
        return false;
    }
}
}
```

-continued

Appendix A

```
The following is some sample code for the Agenda suggestions:
    package edu.mit.cairo.client;
    import java.awt.*;
    import java.applet.*;
    import java.net.*;
    import java.util.*;
    public class AgendaSuggest extends Panel {
        int gid=0;
        AgendaDisplay _mymanager;
    .
    .
    .
            HTTPS = _mymanager.getHTTPS();
            mytext = new String(thetext);
        }
        public void init() {
            Panel bottompanel = new Panel();
            Panel toppanel = new Panel();
            bottompanel.setLayout(new GridLayout(1,2));
            try {
                sphinx = getToolkit().getImage(new
    URL(HTTPS+"/cairoicons/faceicons/agent/agent.gif"));
            } catch (MalformedURLException mu) {}
            ip = new ImagePanel("Sphinx",sphinx,this);
            //ip.addObject(new MapLabel("",.2166,.1765,
            new Font("Helvetica",
    Font.BOLD, 14),ip));
            bottompanel.add(new Button("Accept"));
            bottompanel.add(new Button("Reject"));
            //ip.setSize(300,300);
            setLayout(new BorderLayout());
            add("Center",ip);
            add("South",bottompanel);
        }
        public void play() {
            Vector lines = new Vector();
            StringTokenizer st = new StringTokenizer(mytext);
            String line = "";
            String temp;
            int i=0;
            try{
                Thread.sleep(3000);
            } catch (InterruptedException ignored) {}
            while(!(temp = st.nextToken().trim()).equals("done")) {
                String check = "";
                if(line.length() == 0)
                    check = temp;
                else
                    check = line+" "+temp;
                if(check.length()>30) {
                    lines.addElement(line);
                    line = temp;
                } else line = check;
            }
            lines.addElement(line);
            for(int j=0;j<lines.size();j++) {
                ip.addObject(new
    MapLabel((String)lines.elementAt(j),.1166,.4365+(.1*j),new
    Font("Helvetica", Font.BOLD, 10),ip));
                i=0;
                int step = (ip.getSize().width-20)/20;
                while(i < 20) {
                    try{
                        Thread.sleep(100);
                    } catch(InterruptedException ignored) {}
                    ip.repaint(10+(i*step),(int)((.4365+
                    (.1*j))*ip.getSize().height)-10,step,15);
                    i++;
                }
            }
        }
        public boolean handleEvent(Event e) {
            if((e.id == Event.ACTION_EVENT)&&
                (e.target instanceof Button)) {
                String butt = (String)e.arg;
                if (butt.equals("Accept")) {
                    _mymanager.selectNext();
                    System.out.println("Agenda Accepting");
                    getParent().hide();
                }
                if (butt.equals("Reject")) {
                    System.out.println("Agenda Rejecting");
                    getParent().hide();
                }
            }
            switch (e.id) {
            case Event.WINDOW_DESTROY:
                System.exit(0);
                return true;
            default:
                return false;
            }
        }
    }
```

What is claimed is:

1. A conferencing comprising:
   (a) a plurality of participants;
   (b) a like plurality of facilitator agents, each of said facilitator agents associated with a corresponding one of said plurality of participants, each said plurality of facilitator agents including:
      (1) means for monitoring communication of a participant in the conferencing system;
      (2) means for comparing the communication of the participant to a predetermined set of communication passages;
      (3) means for providing a prompt to a participant in the conferencing system in response to the means for comparing finding a match between the communication of a participant and one of the predetermined set of communication passages; and
      (4) means for presenting a caricature representation that informs the user of its current process state;
   (c) a like plurality of social agents each of said social agents associated with a corresponding one of said plurality of participants, each of said social agents including:
      (1) means for monitoring relevant components of a design environment and suggesting appropriate actions to be taken by a participant; and
   (d) means for learning how to effectively represent each individual of a plurality of individuals in the design environment.

2. The conferencing system of claim 1 wherein said means for comparing the communication of the participant to a predetermined set of communication passages includes means for learning communication passages by being presented with one or more situation-action pairs which are classified in a rule-base such that said facilitator agent can proactively respond to future situations without user intervention.

3. The conferencing system of claim 1 wherein said means for monitoring relevant components of a design environment and suggesting appropriate actions to be taken by a participant includes means for monitoring and suggesting by being presented with one or more situation-action pairs which are classified in a rule-base such that said social agent can proactively respond to future situations without user intervention.

4. The conferencing system of claim 1 wherein said social agents express an emotion of a participant.

5. The conferencing system of claim 1 wherein said facilitator agents suggests a change of forum in response to a particular agenda item.

6. The system of claim 1 wherein said facilitator agent further comprises means for evolving a reaction with the use of the conferencing system.

7. The system of claim 1 wherein said facilitator agent further comprises:
means for coupling to a control mechanism; and
means for establishing an appropriate control mechanism for a given forum setting.

8. The system of claim 1 wherein at least one of said facilitator agents further comprises means for building a rapport with a conferring participant through an interface technique that builds trust between the participant and each of the at least one of said facilitator agents.

9. The system of claim 1 wherein said facilitator agent farther comprises:
means for presenting a choice to a participant; and
means for accepting a decision from the participant.

10. The system of claim 1 wherein the process state corresponds to one of thinking, suggesting, gratified, disappointed, or confused.

11. The system of claim 1 further comprising emotion representing means for providing a suggestion in response to a decision and for showing expressions of sadness or happiness dependent upon the reaction of the participant.

12. The system of claim 1 further comprising means for building thresholds for decisions that may be taken without user intervention.

13. The system of claim 1 further comprising means for encoding user preferences for agent autonomy such that said agent includes an indication of what decisions the participant with which the agent is associated is willing to delegate to the agent.

14. The system of claim 1 wherein the agent's decisions on process interventions are based on the following aspects of the agent environment:
(a) a current topic's recommendation list;
(b) threshold levels indicating user preferences;
(c) an averaged record of the participation of each participant in a negotiation process; and
(d) a complete conversation model of an ongoing negotiation.

15. The system of claim 1 further comprising:
means for generating a vector representing the averages of the on-line time consumed by each participant in a forum;
means for generating a vector representing the amount of recommendations generated regarding a specific intent;
means for generating a vector representing the average time a participant in a forum waits before given the right to speak; and
means for generating a vector representing the relevance of a topic to each participant in a forum.

16. The system of claim 15 wherein a weight is assigned to each of the vectors and the elements are summed.

17. The system of claim 16 wherein the weights are adjustable by a user.

18. The system of claim 1 wherein the facilitator agent distinguishes between: (1) brainstorming/free control strategy, (2) a lecture control strategy; and (3) a chairperson control strategy.

19. The system of claim 1 wherein said social agent further comprises:
means for becoming more familiar with a participant with which the agent is associated;
means for cooperating with the agents of other participants in the conferencing system to decide upon an appropriate meeting control scheme; and
means for reaching a consensus on a meeting process intervention.

20. The system of claim 1 wherein at least one of said facilitator agents further comprises:
means for becoming more familiar with a participant with which the agent is associated;
means for cooperating with the agents of other participants in the conferencing system to decide upon an appropriate meeting control scheme; and
means for reaching a consensus on a meeting process intervention.

* * * * *

UNITED STATES PATENT AND TRADEMARK OFFICE
CERTIFICATE OF CORRECTION

| | |
|---|---|
| PATENT NO. | : 7,007,235 B1 |
| APPLICATION NO. | : 09/540947 |
| DATED | : February 28, 2006 |
| INVENTOR(S) | : Hussein et al. |

It is certified that error appears in the above-identified patent and that said Letters Patent is hereby corrected as shown below:

Column 2, line 51 delete "comparing finding" and replace with --comparing and finding--.

Column 3, line 49 delete "is a system" and replace with --in a system--.

Column 6, line 52 delete "forum a" and replace with --forum, a--.

Column 6, line 66 delete "(2) inteljection" and replace with --(2) interjection--.

Column 7, line 20 delete "control enables/disables" and replace with --control, enables/disables--.

Column 7, line 46 delete "conferencing" and replace with --conferencing.--.

Column 8, lines 19-20 delete "conversation ALL/NONE," and replace with --conversation = ALL/NONE,--.

Column 8, line 39 delete "agent The" and replace with --agent. The--.

Column 8, line 54 delete "client 44a-44c" and replace with --clients 44a-44c--.

Column 9, line 53 delete "users etc...)" and replace with --users, etc ...).--.

Column 9, line 64 delete "pending etc ...)." and replace with --pending, etc ...).--.

Column 9, line 66 delete "Information" and replace with --information--.

Column 10, line 6 delete "particular situation the" and replace with --particular situation, the--.

Column 10, line 29 delete "achieve this a method" and replace with --achieve this, a method--.

Column 10, line 50 delete "FIG. 5 a" and replace with --FIG. 5, a--.

Column 11, line 54 delete "Class room" and replace with --Classroom--.

Column 12, line 10 delete "an forum" and replace with --a forum--.

Column 12, line 12 delete "has fields" and replace with --fields--.

UNITED STATES PATENT AND TRADEMARK OFFICE
CERTIFICATE OF CORRECTION

| | |
|---|---|
| PATENT NO. | : 7,007,235 B1 |
| APPLICATION NO. | : 09/540947 |
| DATED | : February 28, 2006 |
| INVENTOR(S) | : Hussein et al. |

It is certified that error appears in the above-identified patent and that said Letters Patent is hereby corrected as shown below:

Column 13, line 46 delete "Its simply" and replace with --It's simply--.

Column 13, line 59 delete "to These" and replace with --to. These--.

Column 15, line 22 delete "objectives a" and replace with --objectives, a--.

Column 16, line 52 delete "include functions" and replace with --includes functions--.

Column 17, line 9 delete "participants a" and replace with --participants, a--.

Column 17, line 62 delete "(shown as pictograms of the media," and replace with --(shown as pictograms of the media),--.

Column 18, line 42 delete "is base" and replace with --is based--.

Column 18, line 56 delete "determined the" and replace with --determined, the--.

Column 18, line 57 delete "That is within" and replace with --That is, within--.

Column 19, line 10 delete "i + 10 then" and replace with --i + 10, then--.

Column 19, line 13 delete the first occurrence of "queues" and replace with --queue--.

Column 19, line 13 delete "queues store" and replace with --queue stores--.

Column 19, line 22 delete "list a" and replace with --list, a--.

Column 19, line 31 delete "at a 14 second." and replace with --at 14 seconds.--.

Column 19, line 35 delete "number the" and replace with --number, the--.

Column 19, line 36 delete "frame with smallest" and replace with --frame with the smallest--.

Column 19, lines 38-39 delete "applicable the" and replace with --applicable, the--.

Column 19, line 45 delete "replay, unless" and replace with --replay and unless--.

Column 21, line 52 delete "parameters" and replace with --parameter--.

UNITED STATES PATENT AND TRADEMARK OFFICE
CERTIFICATE OF CORRECTION

| | | |
|---|---|---|
| PATENT NO. | : 7,007,235 B1 | |
| APPLICATION NO. | : 09/540947 | |
| DATED | : February 28, 2006 | |
| INVENTOR(S) | : Hussein et al. | |

It is certified that error appears in the above-identified patent and that said Letters Patent is hereby corrected as shown below:

Column 21, line 56 delete "parameters" and replace with --parameter--.

Column 22, line 20 delete "uncontrolled all" and replace with --uncontrolled is all--.

Column 23, line 11 delete "an Forum" and replace with --a Forum--.

Column 23, line 33 delete "startup the" and replace with --startup, the--.

Column 24, line 4 delete "selected a" and replace with --selected, a--.

Column 24, line 18 delete "above the" and replace with --above, the--.

Column 24, lines 29-30 delete "depressed token" and replace with --depressed, token--.

Column 24, line 35 delete "mode the" and replace with --mode, the--.

Column 24, line 62 delete "Furthermore the" and replace with --Furthermore, the--.

Column 24, line 67 delete "required" and replace with --requires--.

Column 25, line 18 delete "artifact?" and replace with --artifacts?--.

Column 25, line 34 delete "combine" and replace with --combined--.

Column 25, line 40 delete "engagement several" and replace with --engagement, several--.

Column 25, line 49 delete "the metaphor must" and replace with --the metaphor that must--.

Column 25, line 53 delete "interface must" and replace with --interface that must--.

Column 25, line 54 delete "can not" and replace with --cannot--.

Column 25, line 61 delete "exit." and replace with --exit;--.

Column 26, line 5 delete "organization such" and replace with --organization, such--.

Column 26, line 14 delete "representation" and replace with --representations--.

Column 26, line 32 delete "speakers" and replace with --speaker's--.

UNITED STATES PATENT AND TRADEMARK OFFICE
CERTIFICATE OF CORRECTION

| | |
|---|---|
| PATENT NO. | : 7,007,235 B1 |
| APPLICATION NO. | : 09/540947 |
| DATED | : February 28, 2006 |
| INVENTOR(S) | : Hussein et al. |

It is certified that error appears in the above-identified patent and that said Letters Patent is hereby corrected as shown below:

Column 26, line 42 delete "speakers" and replace with --speaker's--.

Column 26, line 52 delete "tools the" and replace with --tools, the--.

Column 27, line 7 delete "engaged the" and replace with --engaged, the--.

Column 28, line 19 delete "Further assume" and replace with --Further, assume--.

Column 28, line 36 delete "arrangement another" and replace with --arrangement, another--.

Column 29, lines 42-43 delete "illustrates" and replace with --illustrate--.

Column 29, line 53 delete "now FIG. 21," and replace with --now to FIG. 21,--.

Column 29, line 59 delete "now FIG. 22" and replace with --now to FIG. 22,--.

Column 30, line 8 delete "now FIG. 23," and replace with --now to FIG. 23,--.

Column 30, line 17 delete "now FIG. 24," and replace with --now to FIG. 24,--.

Column 30, line 18 delete "which includes a" and replace with --includes a--.

Column 30, line 21 delete "associated the" and replace with --associated with the--.

Column 30, line 25 delete "as Audio Q," and replace with --Audio Q,--.

Column 30, line 32 delete "control 285f" and replace with --control 285f.--.

Column 32, lines 7-8 delete "nameserver the" and replace with --nameserver, the--.

Column 33, line 57 delete "remover" and replace with --remove--.

Column 34, line 8 delete "later," and replace with --latter,--.

Column 34, line 9 delete "process a" and replace with --process, a--.

Column 34, line 50 delete "Furthermore the" and replace with --Furthermore, the--.

Column 34, line 65 delete "Next a" and replace with --Next, a--.

UNITED STATES PATENT AND TRADEMARK OFFICE
CERTIFICATE OF CORRECTION

| | |
|---|---|
| PATENT NO. | : 7,007,235 B1 |
| APPLICATION NO. | : 09/540947 |
| DATED | : February 28, 2006 |
| INVENTOR(S) | : Hussein et al. |

It is certified that error appears in the above-identified patent and that said Letters Patent is hereby corrected as shown below:

Column 35, line 12 delete "Next a" and replace with --Next, a--.

Column 35, line 25 delete "forum a" and replace with --forum, a--.

Column 35, line 50 delete "embodiments the" and replace with --embodiments, the--.

Column 35, line 54 delete "364a-365N" and replace with --364a-364N--.

Column 36, line 23 replace "to given a" and replace with --to a given--.

Column 36, line 30 delete "360a the" and replace with --360a, the--.

Column 41, line 18 delete "farther" and replace with --further--.

Signed and Sealed this

First Day of April, 2008

JON W. DUDAS
*Director of the United States Patent and Trademark Office*